(12) United States Patent
Wang et al.

(10) Patent No.: US 12,148,876 B2
(45) Date of Patent: Nov. 19, 2024

(54) ELECTROCHEMICAL APPARATUS AND ELECTRONIC APPARATUS

(71) Applicant: Ningde Amperex Technology Limited, Fujian (CN)

(72) Inventors: Kefei Wang, Ningde (CN); Bing Jiang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 511 days.

(21) Appl. No.: 17/485,807

(22) Filed: Sep. 27, 2021

(65) Prior Publication Data

US 2022/0123357 A1 Apr. 21, 2022

Related U.S. Application Data

(63) Continuation of application No. PCT/CN2021/097825, filed on Jun. 2, 2021.

(30) Foreign Application Priority Data

Oct. 15, 2020 (CN) .......................... 202011101196.5

(51) Int. Cl.
| | | |
|---|---|---|
| H01M 10/0525 | (2010.01) | |
| H01M 4/04 | (2006.01) | |
| H01M 4/583 | (2010.01) | |
| H01M 4/62 | (2006.01) | |
| H01M 10/0567 | (2010.01) | |
| H01M 10/0568 | (2010.01) | |
| H01M 10/0569 | (2010.01) | |
| H01M 4/02 | (2006.01) | |

(52) U.S. Cl.
CPC ..... *H01M 10/0525* (2013.01); *H01M 4/0404* (2013.01); *H01M 4/583* (2013.01); *H01M 4/623* (2013.01); *H01M 10/0567* (2013.01); *H01M 10/0568* (2013.01); *H01M 10/0569* (2013.01); *H01M 2004/021* (2013.01); *H01M 2004/027* (2013.01); *H01M 2004/028* (2013.01); *H01M 2300/0034* (2013.01)

(58) Field of Classification Search
CPC ........ H01M 10/0525; H01M 10/0567; H01M 10/0568; H01M 10/0569; H01M 2004/021; H01M 2004/027; H01M 2004/028; H01M 2300/0034; H01M 4/0404; H01M 4/583; H01M 4/587; H01M 4/622; H01M 4/623; Y02E 60/10
See application file for complete search history.

(56) References Cited

U.S. PATENT DOCUMENTS

| | | | |
|---|---|---|---|
| 2020/0028160 A1 | 1/2020 | Ohsawa et al. | |
| 2020/0099098 A1* | 3/2020 | Wang | H01M 4/64 |
| 2020/0099100 A1 | 3/2020 | Bo et al. | |
| 2020/0127333 A1 | 4/2020 | Oh et al. | |

FOREIGN PATENT DOCUMENTS

| | | |
|---|---|---|
| CN | 106532133 A | 3/2017 |
| CN | 108598488 A | 9/2018 |
| CN | 109301326 A | 2/2019 |
| CN | 109935891 A | 6/2019 |
| CN | 110165219 A | 8/2019 |
| CN | 110212197 A | 9/2019 |
| CN | 110611123 A | 12/2019 |
| CN | 110739448 A | 1/2020 |
| CN | 110943250 A | 3/2020 |
| CN | 111082138 A | 4/2020 |
| CN | 111129498 A | 5/2020 |
| CN | 111640984 A | 9/2020 |
| CN | 111640985 A | 9/2020 |
| CN | 111740147 A | 10/2020 |
| CN | 111769328 A | 10/2020 |
| CN | 112151749 A | 12/2020 |
| JP | 201627528 A | 2/2016 |
| JP | 201791701 A | 5/2017 |
| KR | 1020130125133 A | 11/2013 |
| KR | 1020190060718 A | 6/2019 |
| KR | 1020200010063 A | 1/2020 |
| KR | 1020200044539 A | 4/2020 |
| WO | 2014080891 A1 | 5/2014 |
| WO | 2014080895 A1 | 5/2014 |
| WO | 2014080900 A1 | 5/2014 |

OTHER PUBLICATIONS

International Search Report and Written Opinion issued on Aug. 26, 2021 in corresponding Chinese Application No. PCT/CN2021/097825; 10 pages.
Chinese Office Action issued on Jun. 1, 2021 in corresponding Chinese Application No. 202011101196.5; 19 pages.
Office Action issued on Nov. 29, 2023, in corresponding Korean Application No. 10-2021-7026983, 19 pages.
Review Decision issued on May 26, 2022, in corresponding Chinese Application No. 202011101196.5, 26 pages.
Office Action issued on May 26, 2022, in corresponding Chinese Application No. 202011101196.5, 26 pages.
Office Action issued on Feb. 18, 2022, in corresponding Chinese Application No. 202011101196.5, 14 pages.
Office Action issued on Aug. 19, 2021, in corresponding Chinese Application No. 202011101196.5, 12 pages.

(Continued)

*Primary Examiner* — Victoria H Lynch
(74) *Attorney, Agent, or Firm* — Maier & Maier, PLLC

(57) ABSTRACT

An electrochemical apparatus, including a positive electrode, a negative electrode, and an electrolyte. The negative electrode includes a negative electrode current collector and a negative electrode mixture layer formed on the negative electrode current collector, and the negative electrode mixture layer includes a negative electrode active substance. An elongation at a yield point of the negative electrode mixture layer and D50 of the negative electrode active substance satisfy a specified relationship, and the electrolyte includes a compound having a cyano group.

22 Claims, No Drawings

(56) References Cited

OTHER PUBLICATIONS

Office Action issued on Jan. 20, 2023, in corresponding Chinese Application No. 202011101196.5, 12 pages.
Office Action issued on Oct. 25, 2022, in corresponding Chinese Application No. 202011101196.5, 18 pages.
Extended European Search Report issued on Nov. 4, 2022, in corresponding European Application No. 21772940.9, 7 pages.
Office Action issued on Feb. 21, 2023, in corresponding Japanese Application No. 2021-548634, 11 pages.
Office Action issued on Aug. 15, 2023, in corresponding Japanese Application No. 2021-548634, 4 pages.

* cited by examiner

ELECTROCHEMICAL APPARATUS AND ELECTRONIC APPARATUS

CROSS REFERENCE TO RELATED APPLICATIONS

The present application is a National Stage application of PCT international application: PCT/CN2021/097825, filed on Jun. 2, 2021, which claims the benefit of priority from the China Patent Application No. 202011101196.5, filed on Oct. 15, 2020, the disclosure of which is hereby incorporated by reference in its entirety.

FIELD

This application relates to the field of energy storage, specifically to an electrochemical apparatus and an electronic apparatus, and in particular to a lithium-ion battery.

BACKGROUND

With the development of technologies, electrochemical apparatuses (for example, lithium-ion batteries) have been widely applied in various fields of life and production. The lithium-ion batteries have the advantages of high energy density, long cycle life, and environment friendliness. However, there are also many challenges in application of the lithium-ion batteries in terms of, for example, endurance mileage, costs, charge performance, safety performance, and climbing performance. Improving the rate performance of the lithium-ion batteries usually increases the temperature of the lithium-ion batteries and degrades safety performance of the lithium-ion batteries.

In view of this, it is necessary to provide an electrochemical apparatus and an electronic apparatus that have both high rate performance and good safety performance.

SUMMARY

Embodiments of this application provide an electrochemical apparatus and an electronic apparatus that have improved rate performance and safety performance, so as to resolve at least one problem existing in the related fields to at least some extent.

This application provides an electrochemical apparatus, including a positive electrode, a negative electrode, and an electrolyte. The negative electrode includes a negative electrode current collector and a negative electrode mixture layer formed on the negative electrode current collector, and the negative electrode mixture layer includes a negative electrode active substance. An elongation at a yield point of the negative electrode mixture layer is X %, a median particle size of the negative electrode active substance is Y μm, and 0.1≤X/Y≤30. The electrolyte includes a compound having a cyano group.

According to an embodiment of this application, X is within a range of 10 to 30, and Y is within a range of 1 to 50.

According to an embodiment of this application, based on a weight of the electrolyte, a content percentage of the compound having the cyano group is Z %, and Z is within a range of 0.1 to 10.

According to an embodiment of this application, 2≤X/Z≤100.

According to an embodiment of this application, the negative electrode mixture layer includes rubber, and the rubber includes at least one of styrene-butadiene rubber, isoprene rubber, butadiene rubber, fluorine rubber, acrylonitrile-butadiene rubber, or styrene-propylene rubber.

According to an embodiment of this application, the rubber further includes at least one of an acrylic functional group, a chlorotrifluoroethylene functional group, or a hexafluoropropylene functional group.

According to an embodiment of this application, the negative electrode active substance has at least one of the following characteristics:
 (i) including at least one of artificial graphite, natural graphite, mesophase carbon microsphere, soft carbon, hard carbon, amorphous carbon, silicon-containing material, tin-containing material, or an alloy material; and
 (ii) including metal, where the metal includes at least one of molybdenum, iron, or copper, and based on a weight of the negative electrode mixture layer, a content percentage of the metal is less than 0.05%.

According to an embodiment of this application, the compound having the cyano group includes at least one of succinonitrile, glutaronitrile, adiponitrile, 1,5-dicyanopentane, 1,6-dicyanohexane, tetramethylsuccinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile) ether, 3,5-dioxa-heptanedionitrile, 1,4-bis(cyanoethoxy) butane, diethylene glycol di(2-cyanoethyl) ether, triethylene glycol di(2-cyanoethyl) ether, tetraethylene glycol di(2-cyanoethyl) ether, 1,3-di(2-cyanoethoxy) propane, 1,4-di(2-cyanoethoxy) butane, 1,5-di(2-cyanoethoxy) pentane, ethylene glycol di(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentamethylenetricarbonitrile, 1,2,3-propanetricarbonitrile, 1,3,6-hexanetricarbonitrile, 1,2,6-hexanetricarbonitrile, 1,2,3-tris(2-cyanoethoxy) propane, 1,2,4-tris(2-cyanoethoxy) butane, 1,1,1-tris(cyanoethoxymethylene) ethane, 1,1,1-tris(cyanoethoxymethylene) propane, 3-methyl-1,3,5-tris(cyanoethoxy) pentane, 1,2,7-tris(cyanoethoxy) heptane, 1,2,6-tris(cyanoethoxy) hexane, or 1,2,5-tris(cyanoethoxy) pentane.

According to an embodiment of this application, the compound having the cyano group includes an ether bond-free dinitrile compound and an ether bond-containing dinitrile compound, and a content percentage of the ether bond-free dinitrile compound is greater than a content percentage of the ether bond-containing dinitrile compound.

According to an embodiment of this application, the compound having the cyano group includes a dinitrile compound and a trinitrile compound, and a content percentage of the dinitrile compound is greater than a content percentage of the trinitrile compound.

According to an embodiment of this application, the compound having the cyano group includes a dinitrile compound and a trinitrile compound having an ether bond, and a content percentage of the dinitrile compound is greater than a content percentage of the trinitrile compound having the ether bond.

According to an embodiment of this application, the electrolyte further includes at least one of the following compounds:

a) fluoroethylene carbonate;

b) sulfur-oxygen double bond-containing compound;

c) lithium difluorophosphate; or d) compound of Formula 1:

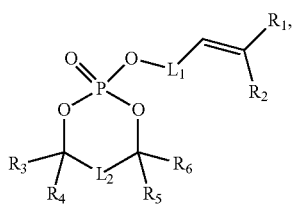

Formula 1 where $R_1$, $R_2$, $R_3$, $R_4$, $R_5$, and $R_6$ each are independently hydrogen or $C_1$-$C_{10}$ alkyl;

$L_1$ and $L_2$ each are independently —$(CR^7R^8)_n$—;

$R^7$ and $R^8$ each are independently hydrogen or $C_1$-$C_{10}$ alkyl; and n is 1, 2, or 3.

According to an embodiment of this application, the compound of Formula 1 includes at least one of the following compounds:

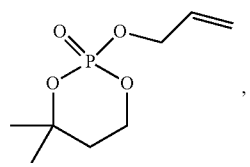

Formula 1-1

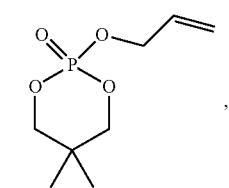

Formula 1-2

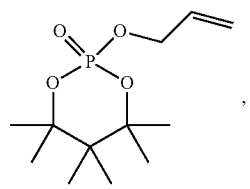

Formula 1-3

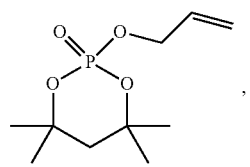

Formula 1-4

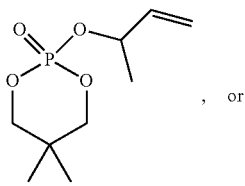

Formula 1-5

, or

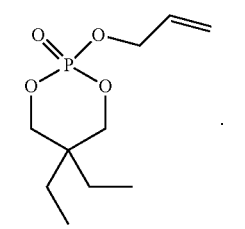

Formula 1-6

According to an embodiment of this application, based on a weight of the electrolyte, a content percentage of the compound of Formula 1 is within a range of 0.01% to 5%.

According to an embodiment of this application, based on a weight of the electrolyte, a content percentage of the fluoroethylene carbonate is b %, and b is within a range of 0.1 to 10.

According to an embodiment of this application, $4 \leq Y \times b \leq 200$.

According to another aspect of this application, this application provides an electronic apparatus, including the electrochemical apparatus according to this application.

Additional aspects and advantages of the embodiments of this application are partially described and presented in subsequent descriptions, or explained by implementation of the embodiments of this application.

DETAILED DESCRIPTION

Embodiments of this application will be described in detail less than. The embodiments of this application should not be interpreted as any limitation on this application.

Unless otherwise expressly indicated, the following terms used in this specification have the meanings described less than.

In specific embodiments and claims, a list of items connected by the term "at least one or may mean any combination of" the listed items. For example, if Item A and Item B are listed, the phrase "at least one of A and B" means only A, only B, or both A and B. In another example, if Item A, Item B, and Item C are listed, the phrase "at least one of A, B, and C" means only A, only B, only C, A and B (excluding C), A and C (excluding B), B and C (excluding A), or all of A, B, and C. Item A may include one element or a plurality of elements. Item B may include one element or a plurality of elements. Item C may include one element or a plurality of elements. The term "at least one type of" has the same meaning as the term "at least one of".

As used in this specification, the term "alkyl group" is intended to be a linear saturated hydrocarbon structure having 1 to 20 carbon atoms. "Alkyl group" is also intended to be a branched or cyclic hydrocarbon structure having 3 to 20 carbon atoms. When an alkyl group having a specific carbon quantity is specified, all geometric isomers having the carbon quantity are intended to be included. Therefore, for example, "a butyl group" means to include an n-butyl group, a sec-butyl group, an isobutyl group, a tert-butyl group, and a cyclobutyl group; and "a propyl group"

includes an n-propyl group, an isopropyl group, and a cyclopropyl group. Examples of the alkyl group include, but are not limited to, a methyl group, an ethyl group, an n-propyl group, an isopropyl group, an cyclopropyl group, an n-butyl group, an isobutyl group, a sec-butyl group, a tert-butyl group, a cyclobutyl group, an n-pentyl group, an isopentyl group, a neopentyl group, a cyclopentyl group, a methylcyclopentyl group, an ethylcyclopentyl group, an n-hexyl group, an isohexyl group, a cyclohexyl group, an n-heptyl group, an octyl group, a cyclopropyl group, a cyclobutyl group, a norbornyl group, and the like.

As used in this specification, the term "halogenated" means that hydrogen atoms in a group are partially or entirely substituted with halogen atoms (for example, fluorine, chlorine, bromine, or iodine).

With the increasing use of electrochemical apparatuses (for example, lithium-ion batteries), people impose higher requirements on performance of the electrochemical apparatuses, including the rate performance and safety performance. However, it is usually difficult to implement both the rate performance and the safety performance. The rate performance of the lithium-ion batteries is improved by means of selecting a positive or negative electrode active substance, electrolyte composition, and optimized battery design. However, the lithium-ion batteries easily generate a great amount of heat during high-rate discharging, imposing an adverse impact on the safety performance of the lithium-ion batteries.

In order to resolve the foregoing problem, in this application, a relationship between an elongation at a yield point of a negative electrode mixture layer and a median particle size (D50) of the negative electrode active substance is adjusted and an electrolyte that contains a compound having a cyano group is also used, so as to make an electrochemical apparatus have lower internal resistance, higher adhesion, higher conductivity, and larger compacted density, thereby significantly improving the rate performance of the electrochemical apparatus while reducing a thickness swelling rate of the electrochemical apparatus under thermal abuse to improve the safety performance of the electrochemical apparatus.

In an embodiment, this application provides an electrochemical apparatus, including a positive electrode, a negative electrode, and an electrolyte as described less than.

I. Negative Electrode

The negative electrode includes a negative electrode current collector and a negative electrode mixture layer formed on one or both surfaces of the negative electrode current collector, and the negative electrode mixture layer includes a negative electrode active substance.

The electrochemical apparatus in this application is characterized in that the elongation at the yield point of the negative electrode mixture layer X % and the D50 Y μm of the negative electrode active substance satisfy: $0.1 \leq X/Y \leq 30$. In some embodiments, $0.5 \leq X/Y \leq 25$. In some embodiments, $1 \leq X/Y \leq 20$. In some embodiments, $3 \leq X/Y \leq 15$. In some embodiments, X/Y is 0.1, 0.5, 1, 2, 5, 8, 10, 12, 15, 18, 20, 25, 30, or within a range between any two of the foregoing values. When the elongation X % of the yield point of the negative electrode mixture layer and the D50 Y μm of the negative electrode active substance satisfy the foregoing relationship, the rate performance and the safety performance of the electrochemical apparatus can be significantly improved.

When the negative electrode mixture layer is stretched, and a tensile force exceeds the limit of elastic deformation, continuous stretching may cause plastic deformation of the negative electrode mixture layer, and a boundary point between elastic deformation and plastic deformation of the negative electrode mixture layer is called "yield point." The elongation at the yield point of the negative electrode mixture layer may be expressed by the following formula: (Stretching length of the negative electrode mixture layer at the yield point−Original length of the negative electrode mixture layer)/Original length of the negative electrode mixture layer×100%.

The elongation at the yield point of the negative electrode mixture layer can be determined by using the following method: attaching a 50 μm-thick polyethylene glycol terephthalate (PET) film to one adhesive surface of a double-sided adhesive tape and attaching the negative electrode mixture layer to the other adhesive surface of the double-sided adhesive tape; removing the negative electrode mixture layer and the PET film together from the negative electrode current collector to obtain a to-be-tested sample; taking a 140 mm-long and 15 mm-wide sample to be tested and fastening the sample onto a clamping plate (a positioning fixture) of a tensile tester, to make a length of a stretchable part of the negative electrode mixture layer reach 100 mm; in a room temperature environment (20° C.±5° C.), stretching the to-be-tested sample in a direction that is substantially orthogonal to a thickness direction of the negative electrode mixture layer (for ±10° along the direction orthogonal to the thickness direction); each time the negative electrode mixture layer is stretched by 1 mm (the elongation is 1% for 1 mm stretching, the elongation is 2% for 2 mm stretching, and so on), stopping stretching, and using an resistance tester with four probes 300 to measure the resistance of the negative electrode mixture layer for three times by using the four-terminal method to obtain an average value; repeating the foregoing steps until the negative electrode mixture layer is broken; using the elongation of the negative electrode mixture layer as the horizontal axis and the resistance of the negative electrode mixture layer as the vertical axis to draw an orthogonal coordinate system, when a resistance difference between two adjacent measuring points exceeds $0.1\Omega$, using a measuring point with a smaller elongation as "the yield point", and recording the elongation at the yield point of the negative electrode mixture layer; and when there are a plurality of yield points, using an elongation at a yield point corresponding to the smallest elongation as the elongation at the yield point of the negative electrode mixture layer.

1. Negative Electrode Mixture Layer

The negative electrode mixture layer may be one or more layers, and each of the plurality of layers of negative electrode active substances may contain the same or different negative electrode active substances. The negative electrode active substance is any material capable of reversibly intercalating and deintercalating metal ions such as lithium ions. In some embodiments, a rechargeable capacity of the negative electrode active substance is greater than a discharge capacity of the positive electrode active substance to prevent lithium metal from accidentally precipitating onto the negative electrode during charging. In some embodiments, the elongation at the yield point of the negative electrode mixture layer is within a range of 10% to 30%. In some embodiments, the elongation at the yield point of the negative electrode mixture layer is within a range of 15% to 25%. The elongation at the yield point of the negative electrode mixture layer is 10%, 12%, 15%, 18%, 20%, 22%, 25%, 28%, 30%, or within a range between any two of the foregoing values. When the elongation at the yield point of the negative electrode mixture layer falls within the foregoing range, the rate performance and the safety performance of the electrochemical apparatus can be further improved.

In some embodiments, the median particle size (D50) of the negative electrode active substance is within a range of 1 μm to 50 μm. In some embodiments, the median particle size (D50) of the negative electrode active substance is within a range of 3 μm to 40 μm. In some embodiments, the median particle size (D50) of the negative electrode active substance is within a range of 5 μm to 30 μm. In some embodiments, the median particle size (D50) of the negative electrode active substance is within a range of 10 μm to 20 μm. In some embodiments, the median particle size of the negative electrode active substance is 1 μm, 5 μm, 10 μm, 15 μm, 20 μm, 25 μm, 30 μm, 35 μm, 40 μm, 45 μm, 50 μm, or within a range between any two of the foregoing values. When the median particle size (D50) of the negative electrode active substance falls within the foregoing range, the rate performance and the safety performance of the electrochemical apparatus can be further improved.

The median particle size (D50) of the negative electrode active substance can be measured by using the following method: dispersing a carbon material in a 0.2% aqueous solution (about 10 mL) of polyoxyethylene (20) sorbitan monolaurate, and using a laser diffraction/scattering particle size distribution analyzer (LA-700 manufactured by Horiba) to conduct testing.

In some embodiments, the negative electrode mixture layer includes rubber. The rubber can effectively improve interface stability of the negative electrode mixture layer, thereby significantly improving the rate performance and safety performance of the electrochemical apparatus.

In some embodiments, the rubber includes at least one of styrene-butadiene rubber, isoprene rubber, butadiene rubber, fluorine rubber, acrylonitrile-butadiene rubber, and styrene-propylene rubber.

In some embodiments, the rubber further includes at least one of an acrylic functional group, a chlorotrifluoroethylene functional group, or a hexafluoropropylene functional group.

In some embodiments, based on a weight of the negative electrode mixture layer, a content percentage of the rubber is less than 10%. In some embodiments, based on a weight of the negative electrode mixture layer, a content percentage of the rubber is less than 8%. In some embodiments, based on a weight of the negative electrode mixture layer, a content percentage of the rubber is less than 5%. In some embodiments, based on a weight of the negative electrode mixture layer, a content percentage of the rubber is less than 3%. In some embodiments, based on a weight of the negative electrode mixture layer, a content percentage of the rubber is less than 2%.

In some embodiments, the negative electrode active substance has at least one of the following characteristics (i) or (ii):

(i) Types of Negative Electrode Active Substances

In some embodiments, the negative electrode active substance includes at least one of artificial graphite, natural graphite, mesophase carbon microsphere, soft carbon, hard carbon, amorphous carbon, silicon-containing material, tin-containing material, and an alloy material.

In some embodiments, the shape of the negative electrode active substance includes but is not limited to fibrous, spherical, granular, and scaly.

In some embodiments, the negative electrode active substance includes a carbon material.

In some embodiments, the negative electrode active substance has a specific surface area of less than 5 $m^2/g$. In some embodiments, the negative electrode active substance has a specific surface area of less than 3 $m^2/g$. In some embodiments, the negative electrode active substance has a specific surface area of less than 1 $m^2/g$. In some embodiments, the negative electrode active substance has a specific surface area of greater than 0.1 $m^2/g$. In some embodiments, the negative electrode active substance has a specific surface area of greater than 0.7 $m^2/g$. In some embodiments, the negative electrode active substance has a specific surface area of greater than 0.5 $m^2/g$.

In some embodiments, the specific surface area of the negative electrode active substance is within a range between any two of the foregoing values. When the specific surface area of the negative electrode active substance falls within the foregoing range, lithium deposition on the electrode surface can be suppressed, and gas generation resulting from reaction of the negative electrode with the electrolyte can be suppressed.

The specific surface area (BET) of the negative electrode active substance can be measured by using the following method: using a surface area meter (a full-automatic surface area measuring device manufactured by OHKURA or RIKEN) to perform pre-drying on the sample at 350° C. for 15 minutes when nitrogen flows, using a nitrogen-helium mixed gas whose relative pressure value of nitrogen is accurately adjusted to 0.3 with respect to atmospheric pressure, and conducting tests by using the nitrogen adsorption BET single-point method for air flow.

In some embodiments, based on an X-ray diffraction graph in the oscillation method, an inter-layer distance of a lattice plane (002 plane) of the negative electrode active substance is within a range of about 0.335 nm to about 0.360 nm, within a range of about 0.335 nm to about 0.350 nm, or within a range of about 0.335 nm to about 0.345 nm.

In some embodiments, based on the X-ray diffraction graph in the oscillation method, a crystallite size (Lc) of the negative electrode active substance is greater than about 1.0 nm or greater than about 1.5 nm.

In some embodiments, a Raman R value of the negative electrode active substance is greater than about 0.01, greater than about 0.03, or greater than about 0.1. In some embodiments, a Raman R value of the negative electrode active substance is less than about 1.5, less than about 1.2, less than about 1.0, or less than about 0.5. In some embodiments, a Raman R value of the negative electrode active substance is within a range between any two of the foregoing values.

A Raman half-peak width of the negative electrode active substance near 1580 $cm^{-1}$ is not particularly limited. In some embodiments, a Raman half-peak width of the negative electrode active substance near 1580 $cm^{-1}$ is greater than 10 $cm^{-1}$ or greater than 15 $cm^{-1}$. In some embodiments, a Raman half-peak width of the negative electrode active substance near 1580 $cm^{-1}$ is less than about 100 $cm^{-1}$, less than about 80 $cm^{-1}$, less than about 60 $cm^{-1}$, or less than about 40 $cm^{-1}$. In some embodiments, a Raman half-peak width of the negative electrode active substance near 1580 $cm^{-1}$ is within a range between any two of the foregoing values.

In some embodiments, a length-to-thickness ratio of the negative electrode active substance is greater than about 1, greater than about 2, or greater than about 3. In some embodiments, a length-to-thickness ratio of the negative electrode active substance is less than about 10, less than about 8, or less than about 5. In some embodiments, a length-to-thickness ratio of the negative electrode active substance is within a range between any two of the foregoing values. When the length-to-thickness ratio of the negative electrode active substance falls within the foregoing range, coating can be more uniform.

(ii) Trace Elements

In some embodiments, the negative electrode active substance includes a metal, and the metal includes at least one of molybdenum, iron, or copper. These metal elements can react with some organic substances having poor conductivity in the negative electrode active substance, thereby facilitating film formation on the surface of the negative electrode active substance.

In some embodiments, the metal elements are present in trace amounts in the negative electrode mixture layer to prevent non-conductive by-products from forming and adhering to the surface of the negative electrode. In some embodiments, based on the weight of the negative electrode mixture layer, a content percentage of the metal is less than 0.05%. In some embodiments, based on the weight of the negative electrode mixture layer, a content percentage of the metal is less than 0.04%. In some embodiments, based on the weight of the negative electrode mixture layer, a content percentage of the metal is less than 0.03%. In some embodiments, based on the weight of the negative electrode mixture layer, a content percentage of the metal is less than 0.01%. When the content percentage of the metal in the negative electrode mixture layer falls within the foregoing range, the rate performance and the safety performance of the electrochemical apparatus can be further improved.

In some embodiments, the negative electrode mixture layer further includes at least one of a silicon-containing material, a tin-containing material, and an alloy material. In some embodiments, the negative electrode mixture layer further includes at least one of a silicon-containing material and a tin-containing material. In some embodiments, the negative electrode mixture layer further includes one or more of a silicon-containing material, a silicon-carbon composite material, a silicon-oxide material, an alloy material, and a lithium-containing metal composite oxide material.

In some embodiments, the negative electrode mixture layer further includes other types of negative electrode active substances, for example, one or more materials that contain a metal element and a metalloid element capable of forming an alloy with lithium. In some embodiments, examples of the metal element and the metalloid element include, but are not limited to, Mg, B, Al, Ga, In, Si, Ge, Sn, Pb, Bi, Cd, Ag, Zn, Hf, Zr, Y, Pd, and Pt. In some embodiments, examples of the metal and metalloid elements include Si, Sn, or a combination thereof. Si and Sn have an excellent capability of deintercalating lithium ions, and can provide a high energy density for the lithium-ion batteries. In some embodiments, other types of negative electrode active substances may further include one or more of a metal oxide and a polymer compound. In some embodiments, the metal oxide includes but is not limited to iron oxide, ruthenium oxide, and molybdenum oxide. In some embodiments, the polymer compounds include, but are not limited to, polyacetylene, polyaniline, and polypyrrole.

Negative Electrode Conductive Material

In some embodiments, the negative electrode mixture layer further includes a negative electrode conductive material, and the conductive material may include any conductive material provided that the conductive material does not cause a chemical change. Non-limitative examples of the conductive material include a carbon-based material (for example, natural graphite, artificial graphite, carbon black, acetylene black, Ketjen black, or carbon fiber), a conductive polymer (for example, a polyphenylene derivative), and a mixture thereof.

Negative Electrode Binder

In some embodiments, the negative electrode mixture layer further includes the negative electrode binder. The negative electrode binder can improve binding between particles of the negative electrode active substance and binding between the negative electrode active substance and the current collector. The type of the negative electrode binder is not particularly limited provided that the binder is a material that is stable to the electrolyte or the solvent used in manufacturing of the electrode.

Examples of the negative electrode binder include, but are not limited to, a resin-based polymer such as polyethylene, polypropylene, polyethylene glycol terephthalate, polymethyl methacrylate, aromatic polyamide, polyimide, cellulose, or nitrocellulose; a rubber polymer such as styrene-butadiene rubber (SBR), isoprene rubber, polybutadiene rubber, fluorine rubber, acrylonitrile•butadiene rubber (NBR), or ethylene•propylene rubber; styrene•butadiene•styrene block copolymer or hydride thereof; a thermoplastic elastomeric polymer such as ethylene•propylene•diene terpolymer (EPDM), styrene•ethylene•butadiene•styrene copolymer, styrene•isoprene•styrene block copolymer or hydride thereof; a soft resinous polymer such as syndiotactic-1,2-polybutadiene, polyvinyl acetate, ethylene•vinyl acetate copolymer, propylene•α-olefin copolymer; a fluorine polymer such as polyvinylidene fluoride, polytetrafluoroethylene, fluorinated polyvinylidene fluoride, and polytetrafluoroethylene•ethylene copolymer; a polymer composition having ion conductivity of alkali metal ions (for example, lithium ion); and so on. The negative electrode binder may be used alone or in any combination.

In a case in which the negative electrode mixture layer contains a fluorine-based polymer (for example, polyvinylidene fluoride), in some embodiments, based on the weight of the negative electrode mixture layer, a content percentage of the negative electrode binder is greater than about 1%, greater than about 2%, or greater than about 3%. In some embodiments, based on the weight of the negative electrode mixture layer, a content percentage of the negative electrode binder is less than about 10%, less than about 8%, or less than about 5%. Based on the weight of the negative electrode mixture layer, a content percentage of the negative electrode binder is within a range between any two of the foregoing values.

Solvent

The type of the solvent used for forming the negative electrode slurry is not particularly limited provided that the solvent is capable of dissolving or dispersing the negative electrode active substance, the negative electrode binder, and the thickener and the conductive material that are used as required. In some embodiments, the solvent used for forming the negative electrode slurry may be any one of an aqueous solvent and an organic solvent. Examples of the aqueous solvent may include, but are not limited to, water, alcohol, and the like. Examples of the organic solvent may include, but are not limited to, N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, hexamethylphosphoramide, dimethyl sulfoxide, benzene, xylene, quinoline, pyridine, methylnaphthalene, hexane, and so on. The solvents may be used alone or in any combination.

Thickener

The thickener is usually used to adjust viscosity of the negative electrode slurry. The type of the thickener is not particularly limited, and examples of the thickener may include, but are not limited to, carboxymethyl cellulose, methyl cellulose, hydroxymethyl cellulose, ethyl cellulose, polyvinyl alcohol, oxidized starch, phosphorylated starch, casein, salt thereof, and the like. The thickener may be used alone or in any combination.

In some embodiments, based on the weight of the negative electrode mixture layer, a content percentage of the thickener is greater than about 0.1%, greater than about 0.5%, or greater than about 0.6%. In some embodiments, based on the weight of the negative electrode mixture layer, the content percentage of the thickener is less than about 5%, less than about 3%, or less than about 2%. When the content percentage of the thickener falls within the foregoing range, a decrease in the capacity of the electrochemical apparatus and an increase in the resistance can be suppressed, and good coating of the negative electrode slurry can be ensured.

Surface Coating

In some embodiments, a substance different from a composition of the negative electrode mixture layer may be adhered to the surface of the negative electrode mixture layer. Examples of the surface adhesion substance of the negative electrode mixture layer include, but are not limited to, oxides such as aluminum oxide, silicon dioxide, titanium dioxide, zirconium oxide, magnesium oxide, calcium oxide, boron oxide, antimony oxide, and bismuth oxide; sulphates such as lithium sulfate, sodium sulfate, potassium sulfate, magnesium sulfate, calcium sulfate, and aluminum sulfate; and carbonates such as lithium carbonate, calcium carbonate, and magnesium carbonate.

Content Percentage of the Negative Electrode Active Substance

In some embodiments, based on the weight of the negative electrode mixture layer, the content percentage of the negative electrode active substance is greater than about 80%, greater than about 82%, or greater than about 84%. In some embodiments, based on the weight of the negative electrode mixture layer, the content percentage of the negative electrode active substance is less than about 99% or less than about 98%. In some embodiments, based on the weight of the negative electrode mixture layer, the content percentage of the negative electrode active substance is within a range between any two of the foregoing values.

Density of the Negative Electrode Active Substance

In some embodiments, the density of the negative electrode active substance in the negative electrode mixture layer is greater than about 1 $g/cm^3$, greater than about 1.2 $g/cm^3$, or greater than about 1.3 $g/cm^3$. In some embodiments, the density of the negative electrode active substance in the negative electrode mixture layer is less than about 2.2 $g/cm^3$, less than about 2.1 $g/cm^3$, less than about 2.0 $g/cm^3$, or less than about 1.9 $g/cm^3$. In some embodiments, the density of the negative electrode active substance in the negative electrode mixture layer is within a range between any two of the foregoing values.

When the density of the negative electrode active substance falls within the foregoing range, damages to particles of the negative electrode active substance can be prevented, deterioration in properties during charging/discharging at the high current density caused by an increase in an initial irreversible capacity of the electrochemical apparatus or a decrease in permeability of the electrolyte in the vicinity of the interface of the negative electrode current collector/the negative electrode active substance can be suppressed, and a decrease in the capacity of the electrochemical apparatus and an increase in the resistance can be also suppressed.

2. Negative Electrode Current Collector

As a current collector for holding the negative electrode active substance, the negative electrode current collector may use any known current collector. Examples of the negative electrode current collector include, but are not limited to, metal materials such as aluminum, copper, nickel, stainless steel, and nickel plated steel. In some embodiments, the negative electrode current collector is copper.

In a case in which the negative electrode current collector is a metal material, the negative electrode current collector may be in forms including but not limited to a metal foil, a metal cylinder, a metal coil, a metal plate, a metal foil, a sheet metal mesh, a punched metal, a foamed metal, and the like. In some embodiments, the negative electrode current collector is a metal film. In some embodiments, the negative electrode current collector is a copper foil. In some embodiments, the negative electrode current collector is a rolled copper foil based on a rolling method or an electrolytic copper foil based on an electrolytic method.

In some embodiments, the thickness of the negative electrode current collector is greater than about 1 μm or greater than about 5 μm. In some embodiments, the thickness of the negative electrode current collector is less than about 100 μm or less than about 50 μm. In some embodiments, the thickness of the negative electrode current collector is within a range between any two of the foregoing values.

A thickness ratio of the negative electrode mixture layer to the negative electrode current collector is a thickness of one side of the negative electrode mixture layer divided by the thickness of the negative electrode current collector, and its value is not particularly limited. In some embodiments, the thickness ratio is less than 50. In some embodiments, the thickness ratio is less than 30. In some embodiments, the thickness ratio is less than 20. In some embodiments, the thickness ratio is less than 10. In some embodiments, the thickness ratio is equal to or greater than 1. In some embodiments, the thickness ratio is within a range between any two of the foregoing values. When the thickness ratio falls within the foregoing range, the capacity of the electrochemical apparatus can be ensured while heat dissipation of the negative electrode current collector during charging and discharging at high current density can be suppressed.

II. Electrolyte

The electrolyte used in the electrochemical apparatus of this application includes an electrolyte substance and a solvent for dissolving the electrolyte substance. In some embodiments, the electrolyte used in the electrochemical apparatus of this application further includes an additive.

Another characteristic of the electrochemical apparatus of this application lies in that the electrolyte includes a compound having a cyano group.

In some embodiments, the compound having the cyano group includes at least one of succinonitrile, glutaronitrile, adiponitrile, 1,5-dicyanopentane, 1,6-dicyanohexane, tetramethylsuccinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile) ether, 3,5-dioxa-heptanedionitrile, 1,4-bis(cyanoethoxy) butane, diethylene glycol di(2-cyanoethyl) ether, triethylene glycol di(2-cyanoethyl) ether, tetraethylene glycol di(2-cyanoethyl) ether, 1,3-di(2-cyanoethoxy) propane, 1,4-di(2-cyanoethoxy) butane, 1,5-di(2-cyanoethoxy) pentane, ethylene glycol di(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentamethylenetricarbonitrile, 1,2,3-propanetricarbonitrile, 1,3,6-hexanetricarbonitrile, 1,2,6-hexanetricarbonitrile, 1,2,3-tris(2-cyanoethoxy) propane, 1,2,4-tris(2-cyanoethoxy) butane, 1,1,1-tris(cyanoethoxymethylene) ethane, 1,1,1-tris(cyanoethoxymethylene) propane, 3-methyl-1,3,5-tris(cyanoethoxy) pentane, 1,2,7-tris(cyanoethoxy) heptane, 1,2,6-tris(cyanoethoxy) hexane, or 1,2,5-tris(cyanoethoxy) pentane.

In some embodiments, the compound having the cyano group includes an ether bond-free dinitrile compound and an ether bond-containing dinitrile compound, and a content percentage of the ether bond-free dinitrile compound is greater than a content percentage of the ether bond-containing dinitrile compound.

In some embodiments, the compound having the cyano group includes a dinitrile compound and a trinitrile compound, and a content percentage of the dinitrile compound is greater than a content percentage of the trinitrile compound.

In some embodiments, the compound having the cyano group includes a dinitrile compound and a trinitrile compound having an ether bond, and a content percentage of the dinitrile compound is greater than a content percentage of the trinitrile compound having the ether bond.

In some embodiments, based on a weight of the electrolyte, a content percentage of the compound having the cyano group is Z %, and Z is within a range of 0.1 to 10. In some embodiments, Z is within a range of 0.5 to 8. In some embodiments, Z is within a range of 1 to 5. In some embodiments, Z is 0.1, 0.5, 1, 2, 5, 8, 10, or within a range between any two of the foregoing values. When the content percentage of the compound having the cyano group in the electrolyte falls within the foregoing range, the rate performance and the safety performance of the electrochemical apparatus can be further improved.

In some embodiments, the content percentage Z % of the compound having the cyano group in the electrolyte and the elongation X % at the yield point of the negative electrode mixture layer satisfy: 2≤X/Z≤100. In some embodiments, 5≤X/Z≤80. In some embodiments, 10≤X/Z≤50. In some embodiments, 20≤X/Z≤30. In some embodiments, X/Z is 2, 5, 10, 20, 30, 40, 50, 60, 70, 80, 90, 100, or within a range between any two of the foregoing values. When the content percentage Z % of the compound having the cyano group in the electrolyte and the elongation X % at the yield point of the negative electrode mixture layer satisfy the foregoing relationship, the rate performance and the safety performance of the electrochemical apparatus can be further improved.

In some embodiments, the electrolyte further includes at least one of the following compounds:
a) fluoroethylene carbonate;
b) sulfur-oxygen double bond-containing compound;
c) lithium difluorophosphate; or
d) compound of Formula 1:

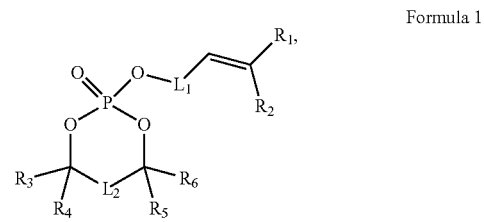

Formula 1 where
$R_1$, $R_2$, $R_3$, $R_4$, $R_5$, and $R_6$ each are independently hydrogen or $C_1$-$C_{10}$ alkyl;
$L_1$ and $L_2$ each are independently —$(CR^7R^8)_n$—;
$R^7$ and $R^8$ each are independently hydrogen or $C_1$-$C_{10}$ alkyl; and
N is 1, 2, or 3.

a) Fluoroethylene Carbonate

During charging/discharging of the electrochemical apparatus, the fluoroethylene carbonate may act with the compound having the cyano group to form a stable protective film on the surface of the negative electrode, so as to suppress decomposition reaction of the electrolyte.

In some embodiments, the fluoroethylene carbonate has a formula C=O(OR$_x$)(OR$_y$), where $R_x$ and $R_y$ each are selected from an alkyl group or haloalkyl group having 1 to 6 carbon atoms. At least one of $R_x$ and $R_y$ is selected from a fluoroalkyl group having 1 to 6 carbon atoms. $R_x$ and $R_y$, optionally together with the atoms to which they are attached, form a 5- to 7-membered ring.

In some embodiments, examples of the fluoroethylene carbonate may include, but are not limited to, one or more of the following: fluoroethylene carbonate, cis-4,4-difluoroethylene carbonate, trans-4,4-difluoroethylene carbonate, 4,5-difluoroethylene carbonate, 4-fluoro-4-methyl ethylene carbonate, 4-fluoro-5-methyl ethylene carbonate, and the like.

In some embodiments, based on a weight of the electrolyte, a content percentage of the fluoroethylene carbonate is b %, and b is within a range of 0.1 to 10. In some embodiments, b is within a range of 0.5 to 8. In some embodiments, b is within a range of 1 to 5. In some embodiments, b is within a range of 2 to 4. In some embodiments, b is 0.1, 0.5, 1, 2, 3, 4, 5, 6, 7, 8, 9, 10, or within a range between any two of the foregoing values. When the content percentage of the fluoroethylene carbonate in the electrolyte falls within the foregoing range, the rate performance and the safety performance of the electrochemical apparatus can be further improved.

In some embodiments, the content percentage b % of the fluoroethylene carbonate in the electrolyte and the median particle size Y μm of the negative electrode active substance satisfy: 4≤Y×b≤200. In some embodiments, 5≤Y×b≤150. In some embodiments, 10≤Y×b≤100. In some embodiments, 20≤Y×b≤50. In some embodiments, Y×b is 4, 5, 10, 20, 50, 80, 100, 120, 150, 180, 200, or within a range between any two of the foregoing values. When the content percentage b % of the fluoroethylene carbonate in the electrolyte and and the median particle size Y μm of the negative electrode active substance satisfy the foregoing relationship, the rate performance and the safety performance of the electrochemical apparatus can be further improved.

b) Sulfur-Oxygen Double Bond-Containing Compound

In some embodiments, the sulfur-oxygen double bond-containing compound includes at least one of the following compounds: cyclic sulfate, linear sulfate, linear sulfonate, cyclic sulfonate, linear sulfite, or cyclic sulfite.

In some embodiments, the cyclic sulfate includes, but is not limited to, one or more of the following: 1,2-ethylene glycol sulfate, 1,2-propanediol sulfate, 1,3-propanediol sulfate, 1,2-butanediol sulfate, 1,3-butanediol sulfate, 1,4-butanediol sulfate, 1,2-pentanediol sulfate, 1,3-pentanediol sulfate, 1,4-pentanediol sulfate, 1,5-pentanediol sulfate, and the like.

In some embodiments, the linear sulfate includes, but is not limited to, one or more of the following: dimethyl sulfate, ethyl methyl sulfate, diethyl sulfate, and the like.

In some embodiments, the linear sulfonate includes, but is not limited to, one or more of the following: fluorosulfonate such as methyl fluorosulfonate and ethyl fluorosulfonate, methyl methanesulfonate, ethyl methanesulfonate, butyl dimethanesulfonate, methyl 2-(methanesulfonyloxy) propionate, or ethyl 2-(methanesulfonyloxy) propionate.

In some embodiments, the cyclic sulfonate includes, but is not limited to, one or more of the following: 1,3-propanesulfonate, 1-fluoro-1,3-propanesulfonate, 2-fluoro-1,3-propanesulfonate, 3-fluoro-1,3-propanesulfonate, 1-methyl-1,3-propanesulfonate, 2-methyl-1,3-propanesulfonate, 3-methyl-1,3-propanesulfonate, 1-propylene-1,3-sulfonate, 2-propylene-1,3-sulfonate, 1-fluoro-1-propylene-1,3-sulfonate, 2-fluoro-1-propylene-1,3-sulfonate, 3-fluoro-1-propylene-1,3-sulfonate, 1-fluoro-2-propylene-1,3-sulfonate, 2-fluoro-2-propylene-1,3-sulfonate, 3-fluoro-2-propylene-1,3-sulfonate, 1-methyl-1-propylene-1,3-sulfonate, 2-methyl-1-propylene-1,3-sulfonate, 3-methyl-1-propylene-1,3-sulfonate, 1-methyl-2-propylene-1,3-sulfonate, 2-methyl-2-propylene-1,3-sulfonate, 3-methyl-2-propylene-1,3-sulfonate, 1,4-butane sulfonate, 1,5-pentanesulfonate, methylene disulfonate, or ethylene methane disulfonate In some embodiments, the linear sulfite includes, but is not limited to, one or more of the following: dimethyl sulfate, ethyl methyl sulfate, diethyl sulfate, and the like.

In some embodiments, the cyclic sulfite includes, but is not limited to, one or more of the following: 1,2-ethylene glycol sulfite, 1,2-propanediol sulfite, 1,3-propanediol sulfite, 1,2-butanediol sulfite, 1,3-butanediol sulfite, 1,4-butanediol sulfite, 1,2-pentanediol sulfite, 1,3-pentanediol sulfite, 1,4-pentanediol sulfite, 1,5-pentanediol sulfite, and the like.

In some embodiments, the sulfur-oxygen double bond-containing compound includes a compound of Formula 2:

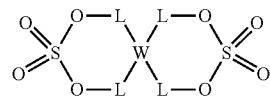

Formula 2 where:

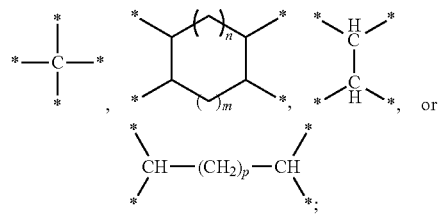

W is selected from

Ls each are independently selected from a single bond or methylene;

m is 1, 2, 3, or 4;

n is 0, 1, or 2; and p is 0, 1, 2, 3, 4, 5, or 6.

In some embodiments, the compound of Formula 2 includes at least one of the following compounds:

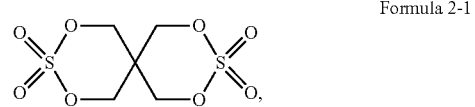

Formula 2-1

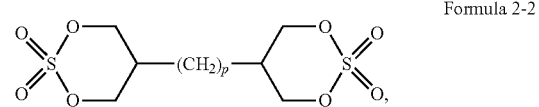

Formula 2-2

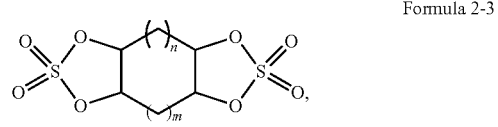

Formula 2-3

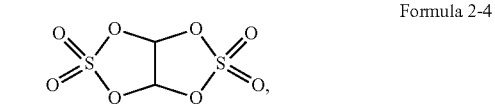

Formula 2-4

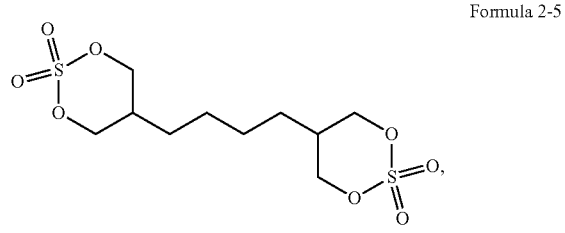

Formula 2-5

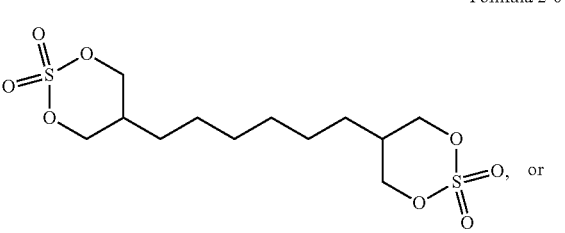

Formula 2-6

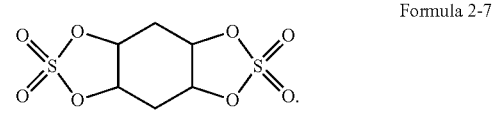

Formula 2-7

In some embodiments, based on the weight of the electrolyte, a content percentage of the sulfur-oxygen double bond-containing compound is within a range of 0.01% to 10%. In some embodiments, based on the weight of the electrolyte, the content percentage of the sulfur-oxygen double bond-containing compound is within a range of 0.05% to 8%. In some embodiments, based on the weight of the electrolyte, the content percentage of the sulfur-oxygen double bond-containing compound is within a range of 0.1% to 5%. In some embodiments, based on the weight of the electrolyte, the content percentage of the sulfur-oxygen double bond-containing compound is within a range of 0.5% to 3%. In some embodiments, based on the weight of the electrolyte, the content percentage of the sulfur-oxygen double bond-containing compound is within a range of 1% to 2%. In some embodiments, based on the weight of the electrolyte, the content percentage of the sulfur-oxygen double bond-containing compound is 0.01%, 0.05%, 0.1%, 0.5%, 0.8%, 1%, 2%, 5%, 8%, 10%, or within a range between any two of the foregoing values.

c) Lithium Difluorophosphate (LiPO$_2$F$_2$)

In some embodiments, based on the weight of the electrolyte, a content percentage of lithium difluorophosphate is 0.01% to 1.5%. In some embodiments, based on the weight of the electrolyte, the content percentage of lithium difluorophosphate is 0.05% to 1.2%. In some embodiments, based on the weight of the electrolyte, the content percentage of lithium difluorophosphate is 0.1% to 1.0%. In some embodiments, based on the weight of the electrolyte, the content percentage of lithium difluorophosphate is 0.5% to 0.8%. In some embodiments, based on the weight of the electrolyte, the content percentage of the lithium difluorophosphate is 0.01%, 0.05%, 0.1%, 0.15%, 0.2%, 0.25%, 0.3%, 0.35%, 0.4%, 0.45%, 0.5%, 0.8%, 1%, 1.5%, or within a range between any two of the foregoing values.

d) Compound of Formula 1

In some embodiments, the compound of Formula 1 includes at least one of the following compounds:

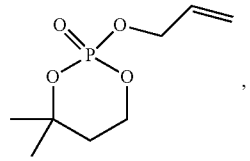

Formula 1-1

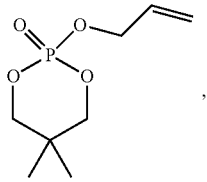

Formula 1-2

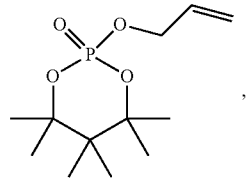

Formula 1-3

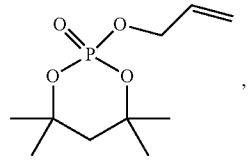

Formula 1-4

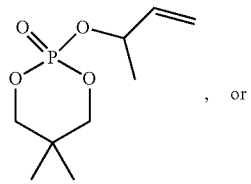

Formula 1-5

, or

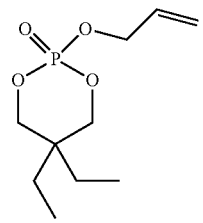

Formula 1-6

In some embodiments, based on the weight of the electrolyte, a content percentage of the compound of Formula 1 is within a range of 0.01% to 5%. In some embodiments, based on the weight of the electrolyte, the content percentage of the compound of Formula 1 is within a range of 0.05% to 4%. In some embodiments, based on the weight of the electrolyte, the content percentage of the compound of Formula 1 is within a range of 0.1% to 3%. In some embodiments, based on the weight of the electrolyte, the content percentage of the compound of Formula 1 is within a range of 0.5% to 2%. In some embodiments, based on the weight of the electrolyte, the content percentage of the compound of Formula 1 is within a range of 1% to 1.5%. In some embodiments, based on the weight of the electrolyte, the content percentage of the compound of Formula 1 is 0.01%, 0.05%, 0.1%, 0.5%, 1%, 2%, 3%, 4%, 5%, or within a range between any two of the foregoing values. When the content percentage of the compound of Formula 1 falls within the foregoing range, the rate performance and the safety performance of the electrochemical apparatus can be further improved.

Solvent

In some embodiments, the electrolyte further includes any non-aqueous solvent that is known in the art and that may be used as a solvent for the electrolyte.

In some embodiments, the non-aqueous solvent includes, but is not limited to, one or more of the following: cyclic carbonate, linear carbonate, cyclic carboxylic acid ester, linear carboxylic acid ester, cyclic ether, linear ether, a phosphorus-containing organic solvent, a sulfur-containing organic solvent, and an aromatic fluorine-containing solvent.

In some embodiments, examples of the cyclic carbonate may include, but are not limited to, one or more of the following: ethylene carbonate (EC), propylene carbonate (PC), and butylene carbonate. In some embodiments, the cyclic carbonate has 3 to 6 carbon atoms.

In some embodiments, examples of the linear carbonate may include, but are not limited to, one or more of the following: dimethyl carbonate, ethyl methyl carbonate, diethyl carbonate (DEC), methyl n-propyl carbonate, ethyl n-propyl carbonate, dipropyl carbonate, and the like. Examples of the linear carbonate substituted with fluorine may include, but are not limited to, one or more of the following: bis(fluoromethyl) carbonate, bis(difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethyl methyl carbonate, 2,2-difluoroethyl methyl carbonate, 2,2,2-trifluoroethyl methyl carbonate, and the like.

In some embodiments, examples of the cyclic carboxylic acid ester may include, but are not limited to, one or more of the following: γ-butyrolactone and γ-valerolactone. In some embodiments, some hydrogen atoms of the cyclic carboxylic acid ester may be substituted with fluorine.

In some embodiments, examples of the linear carboxylic acid esters may include, but are not limited to, one or more of the following: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, some hydrogen atoms of the linear carboxylic acid ester may be substituted with fluorine. In some embodiments, examples of the fluorine-substituted linear carboxylic acid ester may include, but are not limited to, methyl trifluoroacetate, ethyl trifluoroacetate, propyl trifluoroacetate, butyl trifluoroacetate, 2,2,2-trifluoroethyl trifluoroacetate, and the like.

In some embodiments, examples of the cyclic ether may include, but are not limited to, one or more of the following: tetrahydrofuran, 2-methyltetrahydrofuran, 1,3-dioxolane, 2-methyl 1,3-dioxolane, 4-methyl 1,3-dioxolane, 1,3-dioxane, 1,4-dioxane, or dimethoxypropane.

In some embodiments, examples of the linear ether may include, but are not limited to, one or more of the following: dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, or 1,2-ethoxymethoxyethane.

In some embodiments, examples of the phosphorus-containing organic solvent may include, but are not limited to, one or more of the following: trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, or tris(2,2,3,3,3-pentafluoropropyl) phosphate, and the like.

In some embodiments, examples of the sulfur-containing organic solvent may include, but are not limited to, one or more of the following: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, or dibutyl sulfate. In some embodiments, a portion of hydrogen atoms of the sulfur-containing organic solvent may be substituted with fluorine.

In some embodiments, the aromatic fluorine-containing solvent includes, but is not limited to, one or more of the following: fluorobenzene, difluorobenzene, trifluorobenzene, tetrafluorobenzene, pentafluorobenzene, hexafluorobenzene, or trifluoromethylbenzene.

In some embodiments, solvents used in the electrolyte of this application include cyclic carbonate, linear carbonate, cyclic carboxylic acid ester, linear carboxylic acid ester, or a combination thereof. In some embodiments, the solvent used in the electrolyte of this application includes an organic solvent selected from a group consisting of the following substances: ethylene carbonate, propylene carbonate, diethyl carbonate, ethyl propionate, propyl propionate, n-propyl acetate, ethyl acetate, or a combination thereof. In some embodiments, the solvent used in the electrolyte of this application includes ethylene carbonate, propylene carbonate, diethyl carbonate, ethyl propionate, propyl propionate, γ-butyrolactone, or a combination thereof.

Additive

In some embodiments, examples of the additive may include, but are not limited to, one or more of the following: fluorocarbonate, carbon-carbon double bond-containing vinyl carbonate, sulfur-oxygen double bond-containing compound, or anhydride.

In some embodiments, based on the weight of the electrolyte, a content percentage of the additive is 0.01% to 15%, 0.1% to 10%, or 1% to 5%.

According to an embodiment of this application, based on the weight of the electrolyte, the content percentage of the propionate is 1.5 to 30 times, 1.5 to 20 times, 2 to 20 times, or 5 to 20 times of the additive.

In some embodiments, the additive includes one or more carbon-carbon double bond-containing vinyl carbonates. Examples of the carbon-carbon double bond-containing vinyl carbonate may include, but are not limited to, one or more of the following: vinylidene carbonate, methylvinylidene carbonate, ethylvinylidene carbonate, 1,2-dimethylvinylidene carbonate, 1,2-diethylvinylidene carbonate, fluorovinylidene carbonate, trifluoromethylvinylidene carbonate; vinylethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, 1,2-divinylethylene carbonate, 1,1-dimethyl-2-methylene ethylene carbonate, 1,1-diethyl-2-methylene ethylene carbonate, and the like. In some embodiments, the carbon-carbon double bond containing vinyl carbonate includes vinylidene carbonate, and can easily achieve better effects.

In some embodiments, the additive is a combination of fluorocarbonate and carbon-carbon double bond containing vinyl carbonate. In some embodiments, the additive is a combination of fluorocarbonate and the sulfur-oxygen double bond-containing compound. In some embodiments, the additive is a combination of fluorocarbonate and a compound having 2 to 4 cyano groups. In some embodiments, the additive is a combination of fluorocarbonate and cyclic carboxylic acid ester. In some embodiments, the additive is a combination of fluorocarbonate and cyclic phosphoric anhydride. In some embodiments, the additive is a combination of fluorocarbonate and carboxylic anhydride. In some embodiments, the additive is a combination of fluorocarbonate and sulfonic anhydride. In some embodiments, the additive is a combination of fluorocarbonate and carboxylic sulfonic mixed anhydride.

Electrolyte Substance

The electrolyte substance is not particularly limited, and may use any substance known as the electrolyte substance. For lithium secondary batteries, lithium salts are usually used. Examples of the electrolyte substance may include, but are not limited to, inorganic lithium salts such as $LiPF_6$, $LiBF_4$, $LiClO_4$, $LiAlF_4$, $LiSbF_6$, and $LiWF_7$; lithium tungstates such as $LiWOF_5$; lithium carboxylate salts such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; lithium sulfonate salts such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$; lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, cyclic 1,2-perfluoroethane bissulfonimide lithium, cyclic 1,3-perfluoropropane bissulfonimide lithium, and $LiN(CF_3SO_2)$ ($C_4F_9SO_2$); lithium methylate salts such as $LiC(FSO_2)_3$, $LiC(CF_3SO_2)_3$, and $LiC(C_2F_5SO_2)_3$; (malonate) lithium borate salts such as bis(malonate) lithium borate salt and difluoro(malonate) lithium borate salt; (malonate) lithium phosphate salts such as tris(malonate) lithium phosphate, difluorobis(malonate) lithium phosphate, and tetrafluoro (malonate) lithium phosphate; fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$; lithium oxalate borate salts such as lithium difluorooxalate borate and lithium bis(oxalate) borate; lithium oxalate phosphate salts such as lithium tetrafluorooxalatophosphate, lithium difluorobis(oxalato) phosphate, and lithium tris(oxalato)phosphate; and so on.

In some embodiments, the electrolyte substance is selected from the group consisting of $LiPF_6$, $LiSbF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, cyclic 1,2-perfluoroethanedisulfonimide lithium, cyclic 1,3-perfluoropropanedisulfonimide lithium, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$, lithium difluorooxalate borate, lithium bis(oxalate) borate, or lithium difluorobis(oxalato)phosphate. The electrolyte helps improve the output power performance, the high-rate charge/discharge performance, the high temperature storage performance, the cycle performance, and the like of the electrochemical apparatus.

The content percentage of the electrolyte substance is not particularly limited provided that the effect of this application is not affected. In some embodiments, the total molar concentration of lithium in the electrolyte is greater than 0.3 mol/L, greater than 0.4 mol/L, or greater than 0.5 mol/L. In some embodiments, the total molar concentration of lithium in the electrolyte is less than 3 mol/L, less than 2.5 mol/L, or less than 2.0 mol/L. In some embodiments, the total molar concentration of lithium in the electrolyte is within a range between any two of the foregoing values. When the concentration in the electrolyte substance falls within the foregoing range, the amount of lithium as charged particles is not excessively small, and the viscosity can be controlled within an appropriate range, so as to ensure good conductivity.

When two or more electrolyte substances are used, the electrolyte substance includes at least one salt selected from a group consisting of monofluorophosphate, borate, oxalate, and fluorosulfonate. In some embodiments, the electrolyte substance includes a salt selected from a group consisting of monofluorophosphate, oxalate, and fluorosulfonate. In some embodiments, the electrolyte substance includes a lithium salt. In some embodiments, based on the weight of the electrolyte substance, the content percentage of the salt selected from the group consisting of monofluorophosphate, borate, oxalate, and fluorosulfonate is greater than 0.01% or greater than 0.1%. In some embodiments, based on the weight of the electrolyte substance, the content percentage of the salt selected from the group consisting of monofluorophosphate, borate, oxalate, and fluorosulfonate is less than 20% or less than 10%. In some embodiments, the content percentage of the salt selected from the group consisting of monofluorophosphate, borate, oxalate, and fluorosulfonate is within a range between any two of the foregoing values.

In some embodiments, the electrolyte substance includes more than one substance selected from the group consisting of monofluorophosphate, borate, oxalate, and fluorosulfonate and more than one other salt different from the more than one substance. Examples of the other salt include lithium salts exemplified above, and in some embodiments, are $LiPF_6$, $LiN(FSO_2)(CF_3SO_2)$, $LiN(CF_3SO_2)_2$, $LiN(C_2F_5SO_2)_2$, lithium cyclic 1,2-perfluoroethane disulfonimide, lithium cyclic 1,3-perfluoropropane disulfonimide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, and $LiPF_3(C_2F_5)_3$. In some embodiments, the other salt is $LiPF_6$.

In some embodiments, based on the weight of the electrolyte substance, the content percentage of the other salt is greater than 0.01% or greater than 0.1%. In some embodiments, based on the weight of the electrolyte substance, the content percentage of the other salt is less than 20%, less than 15%, or less than 10%. In some embodiments, the content percentage of the other salt is within a range between any two of the foregoing values. The other salt having the foregoing content helps balance the conductivity and viscosity of the electrolyte.

In the electrolyte, in addition to the foregoing solvent, additive, and electrolyte salt, additional additives such as a negative electrode film forming agent, a positive electrode protection agent, and an overcharge prevention agent may be included as necessary. For the additive, an additive generally used in non-aqueous electrolyte secondary batteries may be used, and examples thereof may include, but are not limited to, vinylidene carbonate, succinic anhydride, biphenyls, cyclohexylbenzene, 2,4-difluoroanisole, propane sulfonate, propylene sulfonate, and the like. The additives may be used alone or in any combination. In addition, the content percentage of these additives in the electrolyte is not particularly limited and may be properly set according to the types of the additives or the like. In some embodiments, based on the weight of the electrolyte, the content percentage of the additive is less than 5%, within a range of 0.01% to 5%, or within a range of 0.2% to 5%.

III. Positive Electrode

The positive electrode includes a positive electrode current collector and a positive electrode active substance layer disposed on one or both surfaces of the positive electrode current collector.

1. Positive Electrode Active Substance Layer

The positive electrode active substance layer includes a positive electrode active substance. The positive electrode active substance layer may be one or more layers. Each layer of the multilayer positive electrode active substances may contain the same or different positive electrode active substances. The positive electrode active substance is any material capable of reversibly intercalating and deintercalating metal ions such as lithium ions.

The type of the positive electrode active substance is not particularly limited provided that metal ions (for example, lithium ions) can be electrochemically absorbed and released. In some embodiments, the positive electrode active substance is a material that contains lithium and at least one transition metal. Examples of the positive electrode active substance may include, but are not limited to, lithium transition metal composite oxides and lithium-containing transition metal phosphate compounds.

In some embodiments, transition metals in the lithium transition metal composite oxide include V, Ti, Cr, Mn, Fe, Co, Ni, Cu, and the like. In some embodiments, the lithium transition metal composite oxides include lithium cobalt composite oxides such as $LiCoO_2$, lithium nickel composite oxides such as $LiNiO_2$, lithium manganese composite oxides such as $LiMnO_2$, $LiMn_2O_4$, and $Li_2MnO_4$, and lithium nickel manganese cobalt composite oxides such as $LiNi_{1/3}Mn_{1/3}Co_{1/3}O_2$, and $LiNi_{0.5}Mn_{0.3}Co_{0.2}O_2$, where a portion of transition metal atoms serving as a main body of these lithium transition metal composite oxides is substituted with other elements such as Na, K, B, F, Al, Ti, V, Cr, Mn, Fe, Co, Li, Ni, Cu, Zn, Mg, Ga, Zr, Si, Nb, Mo, Sn, and W. Examples of the lithium transition metal composite oxide may include, but are not limited to, $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$, and $LiMn_{1.5}Ni_{0.5}O_4$. Examples of a combination of lithium transition metal composite oxides include, but are not limited to, a combination of $LiCoO_2$ and $LiMn_2O_4$, where a portion of Mn in $LiMn_2O_4$ may be substituted with a transition metal (for example, $LiNi_{0.33}Co_{0.33}Mn_{0.33}O_2$) and a portion of Co in $LiCoO_2$ may be substituted with a transition metal.

In some embodiments, transition metals in the lithium-containing transition metal phosphate compound include V, Ti, Cr, Mn, Fe, Co, Ni, Cu, and the like. In some embodiments, the lithium-containing transition metal phosphate compound includes iron phosphates such as $LiFePO_4$, $Li_3Fe_2(PO_4)_3$, and $LiFeP_2O_7$, and cobalt phosphates such as $LiCoPO_4$, where a portion of transition metal atoms serving as a main body of these lithium transition metal phosphate compounds are substituted with other elements such as Al, Ti, V, Cr, Mn, Fe, Co, Li, Ni, Cu, Zn, Mg, Ga, Zr, Nb, and Si.

In some embodiments, the positive electrode active substance includes lithium phosphate, which can improve the continuous charging property of the electrochemical apparatus. The use of lithium phosphates is not limited. In some embodiments, the positive electrode active substance and lithium phosphates are used in combination. In some embodiments, the content percentage of the lithium phosphate is greater than 0.1%, greater than 0.3%, or greater than 0.5% relative to the weight of the positive electrode active substance and lithium phosphate. In some embodiments, the content percentage of the lithium phosphate is less than 10%, less than 8%, or less than 5% relative to the weight of the positive electrode active substance and lithium phosphate. In some embodiments, the content percentage of the lithium phosphate is within a range between any two of the foregoing values.

Surface Coating

A substance different from a composition of the positive electrode active substance may be adhered onto the surface of the positive electrode active substance. Examples of the surface adhesion substance include, but are not limited to, oxides such as aluminum oxide, silicon dioxide, titanium dioxide, zirconium oxide, magnesium oxide, calcium oxide, boron oxide, antimony oxide, and bismuth oxide; sulphates such as lithium sulfate, sodium sulfate, potassium sulfate, magnesium sulfate, calcium sulfate, and aluminum sulfate; carbonates such as lithium carbonate, calcium carbonate, and magnesium carbonate; carbon; and so on.

These surface adhesion substances may be adhered to the surface of the positive electrode active substance by using the following methods: a method of dissolving or suspending the surface adhesion substance in the solvent to infiltrate into the positive electrode active substance and then performing drying; a method of dissolving or suspending a surface adhesion substance precursor in the solvent to infiltrate into the positive electrode active substance and then performing heating or the like to implement reaction of the surface adhesion substance; and a method of adding the surface adhesion substance to a positive electrode active substance precursor and performing sintering simultaneously. In a case of carbon adhesion, a method for mechanical adhesion of a carbon material (for example, activated carbon) may also be used.

In some embodiments, based on the weight of the positive electrode active substance layer, the content percentage of the surface adhesion substance is greater than 0.1 ppm, greater than 1 ppm, or greater than 10 ppm. In some embodiments, based on the weight of the positive electrode active substance layer, the content percentage of the surface adhesion substance is less than 10%, less than 8%, or less than 5%. In some embodiments, based on the weight of the positive electrode active substance layer, the content percentage of the surface adhesion substance is within a range between any two of the foregoing values.

Adhering a substance to the surface of the positive electrode active substance can suppress oxidation reaction of the electrolyte on the surface of the positive electrode active substance and improve the service life of the electrochemical apparatus. An excessively small amount of substance adhered to the surface cannot make the effect fully displayed while an excessively large amount of substance adhered to the surface prevents intercalation and deintercalation of lithium ions to increase the resistance sometimes.

In this application, another positive electrode active substance that has a composition different from the positive electrode active substance and that is adhered to the surface of the positive electrode active substance is also called "positive electrode active substance".

Shape

In some embodiments, the shapes of particles of the positive electrode active substance include, but are not limited to, block, polyhedron, spherical, ellipsoidal, plate, needle, column, and the like. In some embodiments, the positive electrode active substance particles include primary particles, secondary particles, or a combination thereof. In some embodiments, the primary particles may agglomerate to form the secondary particles.

Tap Density

In some embodiments, the tap density of the positive electrode active substance is greater than 0.5 $g/cm^3$, greater than 0.8 $g/cm^3$, or greater than 1.0 $g/cm^3$. When the tap density of the positive electrode active substance falls within the foregoing range, the amount of the dispersion medium, the amount of the conductive material, and the amount of the positive electrode binder that are required for forming the positive electrode active substance layer can be suppressed, thereby ensuring a filling rate of the positive electrode active substance and the capacity of the electrochemical apparatus. Using a composite oxide powder with a high tap density can form a positive electrode active substance layer with a high density. Generally, a larger tap density incidates being more preferable, and there is no particular upper limit. In some embodiments, the tap density of the positive electrode active substance is less than 4.0 $g/cm^3$, less than 3.7 $g/cm^3$, or less than 3.5 $g/cm^3$. When the tap density of the positive electrode active substance has the upper limit as described above, an decrease in load characteristics can be suppressed.

The tap density of the positive electrode active substance can be calculated in the following manner: placing 5 g to 10 g of the positive electrode active substance powder into a 10 mL glass measuring cylinder and tapping 200 times at 20 mm stroke to obtain a powder filling density (the tap density).

Median Particle Size (D50)

When the positive electrode active substance particles are primary particles, the median particle size (D50) of the positive electrode active substance particles is a primary particle size of the positive electrode active substance particles. When the primary particles of the positive electrode active substance particles agglomerate to form secondary particles, the median particle size (D50) of the positive electrode active substance particles is a secondary particle size of the positive electrode active substance particles.

In some embodiments, the median particle size (D50) of the positive electrode active substance particles is greater than 0.3 µm, greater than 0.5 µm, greater than 0.8 µm, or greater than 1.0 µm. In some embodiments, the median particle size (D50) of the positive electrode active substance particles is less than 30 µm, less than 27 µm, less than 25 µm, or less than 22 µm. In some embodiments, the median particle size (D50) of the positive electrode active substance particles is within a range between any two of the foregoing values. When the median particle size (D50) of the positive electrode active substance particles falls within the foregoing range, a positive electrode active substance with a high tap density can be implemented, and performance degradation of the electrochemical apparatus can be suppressed. On the other hand, problems such as stripes can be prevented during preparation of the positive electrode of the electrochemical apparatus (that is, when the positive electrode active substance, the conductive material, the binder, and the like are made into a slurry with a solvent and the slurry is applied in a thin-film form). Herein, more than two types of positive electrode active substances having different median particle size s are mixed, to further improve the filling property during preparation of the positive electrode.

The median particle size (D50) of the positive electrode active substance particles can be measured by using a laser diffraction/scattering particle size distribution tester: when LA-920 manufactured by HORIBA is used as a particle size distribution tester, using a 0.1% sodium hexametaphosphate aqueous solution as a dispersion medium for testing, and measuring a result at an refractive index of 1.24 after ultrasonic dispersion for five minutes.

Average Primary Particle Size

When the primary particles of the positive electrode active substance particles agglomerate to form the secondary particles, in some embodiments, the average primary particle size of the positive electrode active substance is greater than 0.05 µm, greater than 0.1 µm, or greater than 0.5 µm. In some embodiments, the average primary particle size of the positive electrode active substance is less than 5 µm, less than 4 µm, less than 3 µm, or less than 2 µm. In some embodiments, the average primary particle size of the positive electrode active substance is within a range between any two of the foregoing values. When the average primary particle size of the positive electrode active substance falls within the foregoing range, the powder filling property and the specific surface area can be ensured, performance degradation of the battery can be suppressed, and moderate crystallinity can be implemented, thereby ensuring reversibility of charging and discharging of the electrochemical apparatus.

The average primary particle size of the positive electrode active substance may be obtained by observing an image from a scanning electron microscope (SEM): in the SEM image magnified 10000 times, for any 50 primary particles, obtaining longest values of slices obtained on the left and right boundary lines of the primary particles relative to the horizontal straight line, and calculating an average value to obtain the average primary particle size.

Specific Surface Area (BET)

In some embodiments, the specific surface area (BET) of the positive electrode active substance is greater than 0.1 m$^2$/g, greater than 0.2 m$^2$/g, or greater than 0.3 m$^2$/g. In some embodiments, the specific surface area (BET) of the positive electrode active substance is less than 50 m$^2$/g, less than 40 m$^2$/g, or less than 30 m$^2$/g. In some embodiments, the specific surface area (BET) of the positive electrode active substance is within a range between any two of the foregoing values. When the specific surface area (BET) of the positive electrode active substance falls within the foregoing range, the performance of the electrochemical apparatus can be ensured, and the positive electrode active substance can have a good coating property.

The specific surface area (BET) of the positive electrode active substance can be measured by using the following method: using a surface area meter (for example, a full-automatic surface area tester manufactured by OHKURA or RIKEN) to perform predrying on the sample at 150° C. for 30 minutes when nitrogen flows, using nitrogen-helium mixed gas whose relative pressure value of nitrogen is accurately adjusted to 0.3 with respect to atmospheric pressure, and conducting tests by using the nitrogen adsorption BET single-point method based on the air flow method.

Positive Electrode Conductive Material

The type of positive electrode conductive material is not limited, and any known conductive material may be used. Examples of the positive electrode conductive material may include, but are not limited to, graphite such as natural graphite and artificial graphite; carbon black such as acetylene black; carbon materials including amorphous carbon such as acicular coke; carbon nanotube; graphene; and the like. The positive electrode conductive material may be used alone or in any combination.

In some embodiments, based on the weight of the positive electrode active substance layer, the content percentage of the positive electrode conductive material is greater than 0.01%, greater than 0.1%, or greater than 1%. In some embodiments, based on the weight of the positive electrode active substance layer, the content percentage of the positive electrode conductive material is less than 10%, less than 8%, or less than 5%. When the content percentage of the positive electrode conductive material falls within the foregoing range, sufficient conductivity and the capacity of the electrochemical apparatus can be ensured.

Positive Electrode Binder

The type of the positive electrode binder used during preparation of the positive electrode active substance layer is not particularly limited, and in the case of using the coating method, any material that can be dissolved or dispersed in a liquid medium used in the preparation of the electrode is acceptable. Examples of the positive electrode binder may include, but are not limited to, one or more of the following: a resin-based polymer such as polyethylene, polypropylene, polyethylene glycol terephthalate, polymethyl methacrylate, polyimide, aromatic polyamide, cellulose, or nitrocellulose; a rubber polymer such as styrene-butadiene rubber (SBR), isoprene rubber, polybutadiene rubber, fluorine rubber, acrylonitrile butadiene rubber (NBR), or ethylene•propylene rubber; styrene•butadiene•styrene block copolymer or hydride thereof; a thermoplastic elastomeric polymer such as ethylene•propylene•diene terpolymer (EPDM), styrene•ethylene•butadiene•styrene copolymer, styrene•isoprene•styrene block copolymer or hydride thereof; a soft resinous polymer such as syndiotactic-1,2-polybutadiene, polyvinyl acetate, ethylene•vinyl acetate copolymer, propylene•α-olefin copolymer; a fluorine polymer such as polyvinylidene fluoride (PVDF), polytetrafluoroethylene, fluorinated polyvinylidene fluoride, polytetrafluoroethylene•ethylene copolymer; a polymer composition having ion conductivity of alkali metal ions (especially, lithium ion); and so on. The positive electrode binder may be used alone or in any combination.

In some embodiments, based on the weight of the positive electrode active substance layer, the content percentage of the positive electrode binder is greater than 0.1%, greater than 1%, or greater than 1.5%. In some embodiments, based on the weight of the positive electrode active substance layer, the content percentage of the positive electrode binder is less than 10%, less than 8%, less than 4%, or less than 3%. When the content percentage of the positive electrode binder falls within the foregoing range, the positive electrode can have good conductivity and sufficient mechanical strength, and the capacity of the electrochemical apparatus can be ensured.

Solvent

The type of the solvent used for forming the positive electrode slurry is not limited provided that the solvent is capable of dissolving or dispersing the positive electrode active substance, the conductive material, the positive electrode binder, and the thickener used as required. Examples of the solvent used to form the positive electrode slurry may include any of an aqueous solvent and an organic solvent. Examples of the aqueous medium may include, but are not limited to, water, a mixed medium of alcohol and water, and the like. Examples of the organic medium may include, but are not limited to, aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine, and N,N-dimethylaminopropylamine; ethers such as diethyl ether, propylene oxide, and tetrahydrofuran (THF); amides such as N-methylpyrrolidone (NMP), dimethylformamide, and dimethylacetamide; aprotic polar solvents such as hexamethylphosphoramide and dimethyl sulfoxide; and so on.

Thickener

The thickener is usually used to adjust viscosity of the slurry. In the case of aqueous media, the thickener and styrene-butadiene rubber (SBR) emulsion may be used for making the slurry. The type of the thickener is not particularly limited, and examples of the thickener may include, but are not limited to, carboxymethyl cellulose, methyl cellulose, hydroxymethyl cellulose, ethyl cellulose, polyvinyl alcohol, oxidized starch, phosphorylated starch, casein, salt thereof, and the like. The thickener may be used alone or in any combination.

In some embodiments, based on the weight of the positive electrode active substance layer, the content percentage of the thickener is greater than 0.1%, greater than 0.2%, or greater than 0.3%. In some embodiments, based on the weight of the positive electrode active substance layer, the content percentage of the thickener is less than 5%, less than 3%, or less than 2%. In some embodiments, based on the weight of the positive electrode active substance layer, the content percentage of the thickener is within a range between any two of the foregoing values. When the content percentage of the thickener falls within the foregoing range, a good coating property of the positive electrode slurry can be ensured, and a decrease in the capacity of the electrochemical apparatus and an increase in the resistance can be suppressed.

Content Percentage of the Positive Electrode Active Substance

In some embodiments, based on the weight of the positive electrode active substance layer, the content percentage of the positive electrode active substance is greater than 80%, greater than 82%, or greater than 84%. In some embodiments, based on the weight of the positive electrode active substance layer, the content percentage of the positive electrode active substance is less than 99% or less than 98%. In some embodiments, based on the weight of the positive electrode active substance layer, the content percentage of the positive electrode active substance is within a range between any two of the foregoing values. When the content percentage of the positive electrode active substance falls within the foregoing range, the capacity of the positive electrode active substance in the positive electrode active substance layer can be ensured while the strength of the positive electrode can be maintained.

Density of the Positive Electrode Active Substance Layer

In order to increase the filling density of the positive electrode active substance, the positive electrode active substance layer obtained by coating and drying can be pressed by using a manual press, a roller, or the like. In some embodiments, the density of the positive electrode active substance layer is greater than 1.5 $g/cm^3$, greater than 2 $g/cm^3$, or greater than 2.2 $g/cm^3$. In some embodiments, the density of the positive electrode active substance layer is less than 5 $g/cm^3$, less than 4.5 $g/cm^3$, or less than 4 $g/cm^3$. In some embodiments, the density of the positive electrode active substance layer is within a range between any two of the foregoing values. When the density of the positive electrode active substance layer falls within the foregoing range, the electrochemical apparatus can have good charge/discharge performance and an increase in the resistance can be suppressed.

Thickness of the Positive Electrode Active Substance Layer

The thickness of the positive electrode active substance layer is the thickness of the positive electrode active substance layer on either side of the positive electrode current collector. In some embodiments, the thickness of the positive electrode active substance layer is greater than 10 μm or greater than 20 μm. In some embodiments, the thickness of the positive electrode active substance layer is less than 500 μm or less than 450 μm.

Manufacturing Method for the Positive Electrode Active Substance

The positive electrode active substance may be manufactured by using a commonly used method for manufacturing an inorganic compound. In order to prepare a spherical or ellipsoidal positive electrode active substance, the following preparation method may be used: dissolving or pulverizing and dispersing the raw material of transition metal in a solvent such as water; adjusting the pH while stirring; making and reclaiming spherical precursors; after drying as needed, adding Li sources such as LiOH, $Li_2CO_3$, and $LiNO_3$; and performing sintering at a high temperature, to obtain the positive electrode active substance.

2. Positive Electrode Current Collector

The type of positive electrode current collector is not particularly limited and may be any known material used as the positive electrode current collector. Examples of the positive electrode current collector may include, but are not limited to, metal materials such as aluminum, stainless steel, a nickel plating layer, titanium, and tantalum; and carbon materials such as a carbon cloth and carbon paper. In some embodiments, the positive electrode current collector is a a metal material. In some embodiments, the positive electrode current collector is aluminum.

The form of the positive electrode current collector is not particularly limited. When the positive electrode current collector is a metal material, the positive electrode current collector may be in forms, including but not limited to a metal foil, a metal cylinder, a metal coil, a metal plate, a metal foil, a sheet metal mesh, a punched metal, a foamed metal, and the like. When the positive electrode current collector is a carbon material, the form of the positive electrode current collector may include, but is not limited to, a carbon plate, a carbon film, a carbon cylinder, and the like. In some embodiments, the positive electrode current collector is a metal foil. In some embodiments, the metal foil is a mesh. The thickness of the metal foil is not particularly limited. In some embodiments, the thickness of the metal foil is greater than 1 µm, greater than 3 µm, or greater than 5 µm. In some embodiments, the thickness of the metal foil is less than 1 mm, less than 100 µm, or less than 50 µm. In some embodiments, the thickness of the metal foil is within a range between any two of the foregoing values.

In order to reduce the electronic contact resistance of the positive electrode current collector and the positive electrode active substance layer, the surface of the positive electrode current collector may include an electrically-conductive additive. Examples of the electrically-conductive additive may include, but are not limited to, carbon and precious metals such as gold, platinum, and silver.

A thickness ratio of the positive electrode active substance layer to the positive electrode current collector is a thickness of one side of the positive electrode active substance layer divided by the thickness of the positive electrode current collector, and its value is not particularly limited. In some embodiments, the thickness ratio is less than 50, less than 30, or less than 20. In some embodiments, the thickness ratio is greater than 0.5, greater than 0.8, or greater than 1. In some embodiments, the thickness ratio is within a range between any two of the foregoing values. When the thickness ratio falls within the foregoing range, heat dissipation of the positive electrode current collector during charging and discharging at high current density can be suppressed, and the capacity of the electrochemical apparatus can be ensured.

3. Preparation of the Positive Electrode

The positive electrode may be prepared by forming, on a current collector, a positive electrode active substance layer containing a positive electrode active substance and a binder. The positive electrode using the positive electrode active substance can be prepared by using a conventional method: dry mixing the positive electrode active substance, the binder, and the conductive material and the thickener that are to be used as required to form a sheet, and pressing the resulting sheet onto the positive electrode current collector; or dissolving or dispersing these materials in a liquid medium to make a slurry, and applying the slurry onto the positive electrode current collector, followed by drying, to form a positive electrode active substance layer on the current collector. Then, the positive electrode is obtained.

IV. Separator

In order to prevent short circuits, a separator is usually provided between the positive electrode and the negative electrode. In this case, the electrolyte of this application usually permeates the separator.

The material and shape of the separator are not particularly limited provided that the separator does not significantly affect the effect of this application. The separator may be a resin, glass fiber, inorganic substance, or the like that is formed of a material stable to the electrolyte of this application. In some embodiments, the separator includes a porous sheet or nonwoven fabric-like material having an excellent fluid retention property, or the like. Examples of the material of the resin or glass fiber separator may include, but are not limited to, polyolefin, aromatic polyamide, polytetrafluoroethylene, polyethersulfone, and the like. In some embodiments, the polyolefin is polyethylene or polypropylene. In some embodiments, the polyolefin is polypropylene. The material of the separator may be used alone or in any combination.

The separator may alternatively be a material formed by laminating the foregoing materials, and examples thereof include, but are not limited to, a three-layer separator formed by laminating polypropylene, polyethylene, and polypropylene in order.

Examples of the material of the inorganic substance may include, but are not limited to, oxides such as aluminum oxide and silicon dioxide, nitrides such as aluminum nitride and silicon nitride, and sulfates (for example, barium sulfate and calcium sulfate). The form of the inorganic substance may include, but are not limited to, a granular or fibrous form.

The form of the separator may be a thin-film form, and examples thereof include, but are not limited to, a nonwoven fabric, a woven fabric, a microporous film, and the like. In the thin-film form, the separator has a pore diameter of 0.01 µm to 1 µm and a thickness of 5 µm to 50 µm. In addition to the independent thin-film-like separator, the following separator may alternatively be used: a separator that is obtained by using a resin-based binder to form a composite porous layer containing the inorganic particles on the surface of the positive electrode and/or the negative electrode, for example, a separator that is obtained by using fluororesin as a binder to form a porous layer on both surfaces of the positive electrode with alumina particles whose particle size s of 90% particles are less than 1 µm.

The thickness of the separator is random. In some embodiments, the thickness of the separator is greater than 1 µm, greater than 5 µm, or greater than 8 µm. In some embodiments, the thickness of the separator is less than 50 µm, less than 40 µm, or less than 30 µm. In some embodiments, the thickness of the separator is within a range between any two of the foregoing values. When the thickness of the separator falls within the foregoing range, the insulation property and the mechanical strength can be ensured, and the rate performance and the energy density of the electrochemical apparatus can be ensured.

When a porous material such as a porous sheet or a nonwoven fabric is used as the separator, the porosity of the separator is random. In some embodiments, the porosity of the separator is greater than 10%, greater than 15%, or greater than 20%. In some embodiments, the porosity of the separator is less than 60%, less than 45%, or less than 40%. In some embodiments, the porosity of the separator is within a range between any two of the foregoing values. When the porosity of the separator falls within the foregoing range, the insulation property and the mechanical strength can be ensured and the film resistance can be suppressed, so that the electrochemical apparatus has good rate performance.

The average pore diameter of the separator is also random. In some embodiments, the average pore diameter of the separator is less than 0.5 µm or less than 0.2 µm. In some embodiments, the average pore diameter of the separator is greater than 0.05 µm. In some embodiments, the average pore diameter of the separator is within a range between any two of the foregoing values. If the average pore diameter of the separator exceeds the foregoing range, a short circuit is likely to occur. When the average pore diameter of the separator falls within the foregoing range, the film resistance can be suppressed and the short circuit is prevented, so that the electrochemical apparatus has good rate performance.

V. Components of the Electrochemical Apparatus

The components of the electrochemical apparatus include an electrode assembly, a collector structure, an outer packing case, and a protection element.

Electrode Assembly

The electrode assembly may be any one of a laminated structure in which the positive electrode and the negative electrode are laminated with the separator interposed therebetween, and a structure in which the positive electrode and the negative electrode are wound in a swirl shape with the separator interposed therebetween. In some embodiments, a mass percentage of the electrode assembly (occupancy of the electrode assembly) in the internal volume of the battery is greater than 40% or greater than 50%. In some embodiments, the occupancy of the electrode assembly is less than 90% or less than 80%. In some embodiments, the occupancy of the electrode assembly is within a range between any two of the foregoing values. When the occupancy of the electrode assembly falls within the foregoing range, the capacity of the electrochemical apparatus can be ensured, and a decrease in repeated charge/discharge performance and high temperature storage property caused by an increasing internal pressure can be suppressed.

Collector Structure

The collector structure is not particularly limited. In some embodiments, the collector structure is a structure that reduces the resistance of a wiring portion and a bonding portion. When the electrode assembly is the foregoing laminated structure, a structure in which metal core portions of the electrode layers are bundled and welded to terminals can be used. An increase in an electrode area of one layer causes a higher internal resistance; therefore, it is also acceptable that more than two terminals are provided in the electrode to decrease the resistance. When the electrode assembly has the foregoing winding structure, more than two lead structures are provided on each of the positive electrode and the negative electrode, and are bundled on the terminals, so as to reduce the internal resistance.

Outer Packing Case

The material of the outer packing case is not particularly limited provided that the material is a substance stable to the electrolyte in use. The outer packing case may use, but is not limited to a nickel-plated steel plate, stainless steel, metals such as aluminium, aluminum alloy, or magnesium alloy, or laminated films of resin and aluminum foil. In some embodiments, the outer packing case is made of metal including aluminum or an aluminum alloy, or be made of a laminated film.

The metal outer packing case includes, but is not limited to, a sealed packaging structure formed by depositing metals through laser welding, resistance welding, and ultrasonic welding; or a riveting structure formed by using the foregoing metal or the like with a resin pad disposed therebetween. The outer packing case using the laminated film includes, but is not limited to, a sealed packaging structure or the like formed by thermally adhering resin layers. In order to improve the sealing property, a resin different from the resin used in the laminated film may be sandwiched between the resin layers. When the sealed structure is formed by thermally adhering the resin layers through current collecting terminals, a resin having a polar group or a modified resin into which a polar group is introduced may be used as the sandwiched resin due to bonding of the metal and the resin. In addition, the shape of the outer packing case may be in any random shape, for example, in any one of a cylindrical shape, a square shape, a laminated shape, a button shape, and the like.

Protection Element

The protection element may use a positive temperature coefficient (PTC), a temperature fuse, and a thermistor whose resistance increases during abnormal heat release or excessive current flows, a valve (current cutoff valve) for cutting off a current flowing in a circuit by sharply increasing an internal pressure or an internal temperature of a battery during abnormal heat release or excessive current flow, or the like. The protection element may be selected from elements that do not operate in conventional high-current use scenarios, or the apparatus may be so designed as not to cause abnormal heat release or thermal runaway even in the absence of the protection element.

VI. Application

The electrochemical apparatus in this application includes any apparatus on which electrochemical reactions occur. Its specific examples include all kinds of primary batteries, secondary batteries, fuel batteries, solar batteries, or capacitors. In particular, the electrochemical apparatus is a lithium secondary battery, including a lithium metal secondary battery or a lithium ion secondary battery.

This application further provides an electronic apparatus, including the electrochemical apparatus in this application.

Usage of the electrochemical apparatus in this application is not particularly limited. The electrochemical apparatus can be used in any electronic apparatus known in the prior art. In some embodiments, the electrochemical apparatus in this application may be used in, but being not limited to, a notebook computer, a pen-input computer, a mobile computer, an e-book player, a portable phone, a portable fax, a portable copier, a portable printer, a headphone stereo, a video recorder, an LCD TV, a handy cleaner, a portable CD player, a mini disk, a transceiver, an electronic notebook, a calculator, a memory card, a portable recorder, a radio, a backup power supply, a motor, a vehicle, a motorcycle, a power assisted cycle, a bicycle, a lighting appliance, a toy, a game player, a clock, an electric tool, a flash lamp, a camera, a large household battery, a lithium-ion capacitor, or the like.

The following uses the lithium-ion battery as an example to describe the preparation of the lithium-ion battery with reference to specific examples. Those skilled in the art can understand that the preparation method described in this application is merely an example, and any other appropriate preparation method falls within the scope of this application.

Examples

The following describes performance evaluation based on the examples and comparative examples of the lithium-ion battery of this application.

I. Preparation of the Lithium-Ion Battery

1. Preparation of the Negative Electrode

Artificial graphite, rubber, and sodium carboxymethylcellulose were mixed in deionized water based on a mass ratio of 96%:2%:2%. After stirring evenly, a negative electrode slurry was obtained. The negative electrode slurry was applied onto the current collector of 12 μm. After steps of drying, cold pressing, cutting, and lug welding, the negative electrode was obtained.

| Rubber | Name |
| --- | --- |
| 1 | Styrene-butadiene rubber (SBR) |
| 2 | Acrylate styrene-butadiene rubber copolymer |
| 3 | Styrene acrylate copolymer |
| 4 | Mixture of chlorotrifluoroethylene and styrene-butadiene rubber |
| 5 | Mixture of HFP (hexafluoropropylene) and styrene-butadiene rubber |

2. Preparation of the Positive Electrode

Lithium cobaltate ($LiCoO_2$), conductive material (Super-P), and polyvinylidene fluoride (PVDF) were mixed in N-methylpyrrolidone (NMP) based on a mass ratio of 95%: 2%:3%. After stirring evenly, a positive electrode slurry was obtained. The positive electrode slurry was applied onto an aluminum foil of 12 μm. After steps of drying, cold pressing, cutting, and lug welding, the positive electrode was obtained.

3. Preparation of the Electrolyte

Under a dry argon environment, EC, PC, and DEC (based on a weight ratio of 1:1:1) were mixed, and $LiPF_6$ was added. After mixing evenly, a base electrolyte was obtained, where the concentration of $LiPF_6$ was 1.15 mol/L. Different amounts of additives were added to the base electrolyte, to obtain different electrolyte used in different examples and comparative examples.

Abbreviations and full names of compositions in the electrolyte are listed in the following table:

| Name of material | Abbreviation | Name of material | Abbreviation |
| --- | --- | --- | --- |
| Ethylene carbonate | EC | Propylene carbonate | PC |
| Ethyl methyl carbonate | EMC | Ethyl propionate | EP |
| Propyl propionate | PP | Fluoroethylene carbonate | FEC |
| Succinonitrile | SN | Adiponitrile | ADN |
| Ethylene glycol di(2-cyanoethyl) ether | EDN | 1,3,6-hexanetricarbonitrile | HTCN |
| 1,2,3-tris(2-cyanoethoxy) propane | TCEP | Lithium difluorophosphate | $LiPO_2F_2$ |
| Formula 1-1 compound | Formula 1-1 | Formula 1-2 compound | Formula 1-2 |
| 1,3-propanesulfonate | PS | 1,2-ethylene sulfate | DTD |
| Formula 2-1 compound | Formula 2-1 | Formula 2-2 compound (p = 1) | Formula 2-2 |
| Difluoroethylene carbonate | DFEC | Formula 2-4 compound | Formula 2-4 |

4. Preparation of the Separator

A polyethylene (PE) porous polymer film was used as the separator.

5. Preparation of the Lithium-Ion Battery

The resulting positive electrode, separator, and negative electrode were wound in order and placed in an outer packing foil, leaving a liquid injection hole. After the steps of injecting the electrolyte into the liquid injection hole, packaging, chemical conversion, and testing capacitance, the lithium-ion battery was obtained.

II. Test Method

1. Test Method for the Rate Performance of the Lithium-Ion Battery

At 25° C., the lithium-ion battery was discharged to 3.0V at 0.2C, and after standing for five minutes, was charged to 4.4V at 0.5C and then charged to 0.05C at a constant voltage. After standing for five minutes, the discharge rate was adjusted and discharge tests were conducted separately at 0.2C and 5.0C, to obtain the discharge capacity. The capacity obtained at a rate of 5.0C was compared with the capacity obtained at 0.2C, to obtain a ratio. The ratio was used to represent the rate performance of the lithium-ion battery.

2. Test Method for the Thickness Swelling Rate of the Lithium-Ion Battery

At 25° C., the lithium-ion battery was kept standing for 30 minutes, and its thickness T1 was measured. Then, the temperature was started to rise at a temperature rise rate of 5° C./min. When the temperature rose to 130° C., the thickness T2 of the lithium-ion battery was measured after standing for 30 minutes. The thickness swelling rate of the lithium-ion battery was calculated by using the following formula:

$$\text{Thickness swelling rate} = [(T2-T1)/T1] \times 100\%$$

III. Test Results

Table 1 shows the impact of the elongation X % at the yield point of the negative electrode mixture layer, the median particle size Y μm of the negative electrode active substance, and their relationship on the rate performance and the thickness swelling rate of the lithium-ion battery.

TABLE 1

| | Electrolyte | | Negative electrode mixture layer | | | | |
| --- | --- | --- | --- | --- | --- | --- | --- |
| | Compound having cyano group | Content Z (%) | X (%) | Y (μm) | X/Y | Rate performance | Thickness swelling rate |
| Comparative Example 1-1 | ADN | 4 | 1 | 20 | 0.05 | 56.2% | 35.1% |
| Comparative Example 1-2 | ADN | 4 | 40 | 1 | 40 | 45.0% | 43.5% |
| Comparative Example 1-3 | / | / | 5 | 50 | 0.1 | 52.5% | 45.2% |
| Comparative Example 1-4 | / | / | 20 | 1 | 20 | 51.8% | 38.5% |
| Example 1-1 | ADN | 4 | 5 | 20 | 0.25 | 67.1% | 16.7% |
| Example 1-2 | ADN | 4 | 10 | 30 | 0.3 | 64.2% | 13.1% |
| Example 1-3 | ADN | 4 | 10 | 50 | 0.2 | 66.9% | 17.5% |

TABLE 1-continued

| | Electrolyte | | Negative electrode mixture layer | | | | Thickness |
|---|---|---|---|---|---|---|---|
| | Compound having cyano group | Content Z (%) | X (%) | Y (μm) | X/Y | Rate performance | swelling rate |
| Example 1-4 | ADN | 4 | 20 | 20 | 1 | 73.4% | 14.2% |
| Example 1-5 | ADN | 4 | 30 | 20 | 1.5 | 74.3% | 10.8% |
| Example 1-6 | ADN | 4 | 30 | 50 | 0.6 | 71.5% | 15.1% |
| Example 1-7 | ADN | 4 | 5 | 50 | 0.1 | 70.1% | 17.8% |
| Example 1-8 | ADN | 4 | 30 | 1 | 30 | 69.8% | 16.2% |
| Example 1-9 | ADN | 4 | 30 | 3 | 10 | 72.3% | 12.5% |
| Example 1-10 | ADN | 4 | 30 | 1.5 | 20 | 71.6% | 13.9% |

"/" means no addition or not having such property.

The results show that when the elongation X % at the yield point of the negative electrode mixture layer and the median particle size Y μm of the negative electrode active substance satisfy 0.1≤X/Y≤30, and the electrolyte contains the compound having the cyano group, the swelling/contraction of the negative electrode occurring during charging/discharging can be suppressed, the interface between the negative electrode mixture layer and the electrolyte can be stabilized, the rate performance of the lithium-ion battery can be significantly improved, and the thickness swelling rate of the lithium-ion battery can be reduced to improve the safety performance of the lithium-ion battery.

Table 2 shows the impact of the rubber on the rate performance and the thickness swelling rate of the lithium-ion battery. Examples 2-1 to 2-9 differ from Example 1-1 only in the parameters listed in Table 2.

TABLE 2

| | Rubber | X (%) | Y (μm) | Rate performance | Thickness swelling rate |
|---|---|---|---|---|---|
| Example 1-1 | 1 | 5 | 20 | 67.1% | 16.7% |
| Example 2-1 | 2 | 15 | 20 | 74.8% | 15.1% |
| Example 2-2 | 3 | 20 | 20 | 75.6% | 14.7% |
| Example 2-3 | 4 | 25 | 20 | 76.9% | 13.1% |
| Example 2-4 | 5 | 30 | 20 | 77.5% | 12.6% |
| Example 2-5 | 5 | 35 | 20 | 72.5% | 15.3% |
| Example 2-6 | 5 | 25 | 10 | 75.8% | 12.7% |
| Example 2-7 | 5 | 25 | 30 | 76.5% | 11.3% |
| Example 2-8 | 1 | 15 | 1 | 73.2% | 15.2% |
| Example 2-9 | 1 | 15 | 50 | 73.3% | 15.1% |

The results show that the elongation at the yield point of the negative electrode mixture layer can be adjusted by using different rubber. When the elongation at the yield point of the negative electrode mixture layer is within a range of 10% to 30% and Y is within a range of 1 to 50, the rate performance of the lithium-ion battery can be further improved and the thickness swelling rate of the lithium-ion battery can be reduced.

Table 3 shows the impact of trace metals in the negative electrode active substance on the rate performance and the thickness swelling rate of the lithium-ion battery. Examples 3-1 to 3-8 differ from Example 1-1 only in the parameters listed in Table 3.

Table 3

| | Metal | | Rate | Thickness |
|---|---|---|---|---|
| | Type | Content (%) | performance | swelling rate |
| Example 1-1 | / | / | 67.1% | 16.7% |
| Example 3-1 | Fe | 0.001 | 76.2% | 15.9% |
| Example 3-2 | Cu | 0.001 | 76.8% | 15.3% |
| Example 3-3 | Mo<br>Fe | 0.003<br>0.001 | 77.2% | 15.5% |
| Example 3-4 | Mo<br>Cu | 0.002<br>0.002 | 78.2% | 13.9% |
| Example 3-5 | Fe<br>Cu | 0.0008<br>0.0006 | 78.5% | 14.1% |
| Example 3-6 | Fe<br>Cu | 0.01<br>0.01 | 78.3% | 15.1% |
| Example 3-7 | Fe<br>Cu | 0.03<br>0.03 | 74.3% | 16.1% |
| Example 3-8 | Fe<br>Cu | 0.04<br>0.05 | 73.5% | 16.5% |

"/" means no addition or not having such property.

The results show that when trace metal elements (that is, iron, molybdenum, and/or copper with a content percentage less than 0.05%) are present in the negative electrode active substance, the rate performance of the lithium-ion battery can be further improved and the thickness swelling rate of the lithium-ion battery can be reduced to improve the safety performance of the lithium-ion battery.

Table 4 shows the impact of the compound having the cyano group on improvement of the rate performance and the thickness swelling rate of the lithium-ion battery. Examples 4-1 to 4-6 differ from Example 1-1 only in the parameters listed in Table 4.

TABLE 4

| | Dinitrile | | Other compounds having cyano group | | Rate perfor- | Thickness swelling |
|---|---|---|---|---|---|---|
| | Type | Content (%) | Type | Content (%) | mance | rate |
| Example 1-1 | ADN | 4 | / | / | 67.1% | 16.7% |
| Example 4-1 | ADN | 4 | EDN | 2 | 78.8% | 15.1% |
| Example 4-2 | ADN | 4 | HTCN | 1 | 79.6% | 14.7% |
| Example 4-3 | ADN | 4 | TCEP | 1 | 80.9% | 13.1% |
| Example 4-4 | SN | 4 | EDN | 1 | 81.5% | 12.3% |
| Example 4-5 | SN | 4 | EDN | 5 | 62.5% | 16.1% |
| Example 4-6 | SN | 4 | HTCN | 6 | 63.5% | 15.2% |

As can be seen from Examples 4-1, 4-4, and 4-5, using a combination of a higher content percentage of the ether bond-free dinitrile compound (ADN or SN) and a lower content percentage of the ether bond-containing dinitrile compound (EDN) can further improve the rate performance of the lithium-ion battery, and reduce the thickness swelling rate of the lithium-ion battery to improve the safety performance of the lithium-ion battery.

As can be seen from Examples 4-2, 4-3, and 4-6, using a combination of a higher content percentage of the ether bond-free dinitrile compound (ADN or SN) and a lower content percentage of the trinitrile compound (HTCN or TCEP) can further improve the rate performance of the lithium-ion battery, and reduce the thickness swelling rate of the lithium-ion battery to improve the safety performance of the lithium-ion battery.

Table 5 shows the impact of the electrolyte composition on the rate performance and the thickness swelling rate of the lithium-ion battery. Examples 5-1 to 5-31 differ from Example 1-1 only in the parameters listed in Table 5.

The results show that, based on that the elongation X % at the yield point of the negative electrode mixture layer and the median particle size Y μm of the negative electrode active substance satisfy $0.1 \leq X/Y \leq 30$ and the electrolyte includes the compound having the cyano group, when the electrolyte further contains fluoroethylene carbonate, the sulphur-oxygen double bond-containing compound, lithium difluorophosphate, and/or the compound of Formula 1, the rate performance of the lithium-ion battery can be further improved and the thickness swelling rate of the lithium-ion battery can be reduced to improve the safety performance of the lithium-ion battery.

Table 6 shows the impact of the relationship between the median particle size Y μm of the negative electrode active substance and the content percentage b % of fluoroethylene carbonate in the electrolyte on the rate performance and the

TABLE 5

| | Fluoro-ethylene carbonate (6%) | Sulfur-oxygen double bond-containing compound (2%) | $LiPO_2F_2$ (0.5%) | Compound of Formula 1 (0.5%) | Rate performance | Thickness swelling rate |
|---|---|---|---|---|---|---|
| Example 1-1 | / | / | / | / | 67.1% | 16.7% |
| Example 5-1 | FEC | / | / | / | 72.5% | 13.6% |
| Example 5-2 | FEC | / | / | / | 73.1% | 14.0% |
| Example 5-3 | / | PS | / | / | 80.8% | 12.5% |
| Example 5-4 | / | DTD | / | / | 81.4% | 11.5% |
| Example 5-5 | / | Formula 2-1 | / | / | 81.9% | 10.6% |
| Example 5-6 | / | Formula 2-2 | / | / | 82.5% | 10.5% |
| Example 5-7 | / | Formula 2-4 | / | / | 82.7% | 10.3% |
| Example 5-8 | / | / | $LiPO_2F_2$ | / | 82.8% | 9.9% |
| Example 5-9 | / | / | / | Formula 1-1 | 82.9% | 9.7% |
| Example 5-10 | / | / | / | Formula 1-2 | 82.7% | 9.8% |
| Example 5-11 | / | / | $LiPO_2F_2$ | Formula 1-1 | 83.0% | 9.6% |
| Example 5-12 | FEC | PS | / | / | 83.9% | 8.8% |
| Example 5-13 | FEC | DTD | / | / | 84.1% | 8.2% |
| Example 5-14 | FEC | Formula 2-1 | / | / | 84.3% | 8.3% |
| Example 5-15 | FEC | Formula 2-2 | / | / | 84.2% | 7.9% |
| Example 5-16 | FEC | Formula 2-4 | / | / | 84.1% | 8.1% |
| Example 5-17 | FEC | / | $LiPO_2F_2$ | / | 84.6% | 8.0% |
| Example 5-18 | FEC | / | / | Formula 1-1 | 84.7% | 7.9% |
| Example 5-19 | FEC | / | / | Formula 1-2 | 85.1% | 7.8% |
| Example 5-20 | FEC | / | $LiPO_2F_2$ | Formula 1-1 | 85.3% | 7.6% |
| Example 5-21 | FEC | Formula 2-2 | $LiPO_2F_2$ | / | 85.2% | 7.6% |
| Example 5-22 | / | Formula 2-2 | / | Formula 1-1 | 85.6% | 8.1% |
| Example 5-23 | / | Formula 2-2 | / | Formula 1-2 | 85.5% | 7.7% |
| Example 5-24 | / | Formula 2-2 | $LiPO_2F_2$ | / | 85.3% | 7.2% |
| Example 5-25 | / | Formula 2-4 | / | Formula 1-1 | 85.7% | 6.9% |
| Example 5-26 | / | Formula 2-4 | / | Formula 1-2 | 85.9% | 6.8% |
| Example 5-27 | / | Formula 2-4 | $LiPO_2F_2$ | / | 86.0% | 6.5% |
| Example 5-28 | FEC | Formula 2-4 | $LiPO_2F_2$ | / | 86.1% | 6.2% |
| Example 5-29 | FEC | Formula 2-4 | / | Formula 1-1 | 86.7% | 6.1% |
| Example 5-30 | FEC | Formula 2-4 | DTD | Formula 1-1 | 86.5% | 6.1% |
| Example 5-31 | FEC | Formula 2-4 | $LiPO_2F_2$ | Formula 1-1 | 87.1% | 6.0% |

"/" means no addition or not having such property.

thickness swelling rate of the lithium-ion battery. Examples 6-1 to 6-9 differ from Example 5-1 only in the parameters listed in Table 6.

TABLE 6

| | Y (μm) | Fluoroethylene carbonate | | Y × b | Rate performance | Thickness swelling rate |
|---|---|---|---|---|---|---|
| | | Type | Content b (%) | | | |
| Example 1-1 | 20 | / | / | 0 | 67.1% | 16.7% |
| Example 5-1 | 20 | FEC | 6 | 120 | 72.5% | 13.6% |
| Example 6-1 | 30 | FEC | 5 | 150 | 76.8% | 12.1% |
| Example 6-2 | 10 | FEC | 0.2 | 2 | 67.8% | 16.2% |
| Example 6-3 | 50 | FEC | 6 | 300 | 68.8% | 16.5% |
| Example 6-4 | 5 | FEC | 0.8 | 4 | 69.8% | 15.1% |
| Example 6-5 | 50 | FEC | 4 | 200 | 69.3% | 15.5% |
| Example 6-6 | 50 | FEC | 0.1 | 5 | 71.5% | 14.1% |
| Example 6-7 | 50 | FEC | 10 | 500 | 68.1% | 16.2% |
| Example 6-8 | 50 | FEC | 0.05 | 2.5 | 67.7% | 16.1% |
| Example 6-9 | 50 | FEC | 12 | 600 | 67.3% | 16.6% |

The results show that when the content percentage of fluoroethylene carbonate in the electrolyte is 0.1% to 10%, the rate performance of the lithium-ion battery can be further improved, and the thickness swelling rate of the lithium-ion battery can be reduced to improve the safety performance of the lithium-ion battery. When the relationship between the median particle size Y μm of the negative electrode active substance and the content percentage b % of fluoroethylene carbonate in the electrolyte satisfy $4 \leq Y \times b \leq 200$, the rate performance of the lithium-ion battery can be further improved and the thickness swelling rate of the lithium-ion battery can be reduced to improve the safety performance of the lithium-ion battery.

Table 7 shows the impact of the relationship between the elongation X % at the yield point of the negative electrode mixture layer and the content percentage Z % of the compound having the cyano group in the electrolyte on the rate performance and the thickness swelling rate of the lithium-ion battery. Examples 7-1 to 7-6 differ from Example 1-1 only in the parameters listed in Table 7.

TABLE 7

| | X (%) | Compound having cyano group | | X/Z | Rate performance | Thickness swelling rate |
|---|---|---|---|---|---|---|
| | | Type | Content Z (%) | | | |
| Example 1-1 | 5 | ADN | 4 | 1.25 | 67.1% | 16.7% |
| Example 7-1 | 8 | SN | 4 | 2 | 77.1% | 12.3% |
| Example 7-2 | 15 | HTCN | 3 | 5 | 82.5% | 8.9% |
| Example 7-3 | 20 | EDN | 2 | 10 | 82.1% | 8.5% |
| Example 7-4 | 30 | TCEP | 3 | 10 | 89.8% | 7.1% |
| Example 7-5 | 20 | TCEP | 0.2 | 100 | 75.3% | 8.8% |
| Example 7-6 | 20 | TCEP | 0.1 | 200 | 67.8% | 14.6% |

The results show that when the relationship between the elongation X % at the yield point of the negative electrode mixture layer and the content percentage Z % of the compound having the cyano group in the electrolyte satisfy $2 \leq X/Z \leq 100$, the rate performance of the lithium-ion battery can be further improved and the thickness swelling rate of the lithium-ion battery can be reduced to improve the safety performance of the lithium-ion battery.

In this specification, reference to "embodiments", "an embodiment", "another example", "examples", "specific examples", or "some examples" means that at least one embodiment or example in this application includes a specific feature, structure, material, or characteristic described in this embodiment or example. Therefore, descriptions that appear in various parts of this specification, such as "in some embodiments", "in the embodiments", "in an embodiment", "in another example", "in an example", "in a specific example", or "examples" do not necessarily reference the same embodiment or example in this application. In addition, a specific feature, structure, material, or property herein may be combined in any appropriate manner in one or more embodiments or examples.

Although illustrative embodiments have been demonstrated and described, those skilled in the art should understand that the foregoing embodiments are not to be construed as limiting this application, and that the embodiments may be changed, replaced, and modified without departing from the spirit, principle, and scope of this application.

What is claimed is:

1. An electrochemical apparatus, comprising:
a positive electrode, a negative electrode, and an electrolyte;
wherein the negative electrode comprises a negative electrode current collector and a negative electrode mixture layer formed on the negative electrode current collector, and the negative electrode mixture layer comprises a negative electrode active substance;
wherein, an elongation at a yield point of the negative electrode mixture layer is X %, and a median particle size of the negative electrode active substance is Y um, and $0.1 \leq X/Y \leq 30$; and
the electrolyte comprises a compound having a cyano group; and
wherein the negative electrode active substance comprises a metal, the metal comprises at least one of molybdenum, iron, or copper, and based on a weight of the negative electrode mixture layer, a content percentage of the metal is greater than 0 and less than 0.05%.

2. The electrochemical apparatus according to claim 1, wherein X is within a range of 10 to 30 and Y is within a range of 1 to 50.

3. The electrochemical apparatus according to claim 1, wherein based on a weight of the electrolyte, a content percentage of the compound having the cyano group is Z %, wherein Z is within a range of 0.1 to 10.

4. The electrochemical apparatus according to claim 3, wherein $2 \leq X/Z \leq 100$.

5. The electrochemical apparatus according to claim 1, wherein the negative electrode mixture layer comprises rubber, and the rubber comprises at least one of styrene-butadiene rubber, isoprene rubber, butadiene rubber, fluorine rubber, acrylonitrile-butadiene rubber or styrene-propylene rubber.

6. The electrochemical apparatus according to claim 5, wherein the rubber further comprises at least one of an acrylic functional group, a chlorotrifluoroethylene functional group, or a hexafluoropropylene functional group.

7. The electrochemical apparatus according to claim 1, wherein the negative electrode active substance further comprises:
at least one of artificial graphite, natural graphite, mesophase carbon microsphere, soft carbon, hard carbon, amorphous carbon, silicon-containing material, tin-containing material, or an alloy material.

8. The electrochemical apparatus according to claim 1, wherein the compound having the cyano group comprises at least one of succinonitrile, glutaronitrile, adiponitrile, 1,5-dicyanopentane, 1,6-dicyanohexane, tetramethylsuccinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile) ether, 3,5-dioxa-heptane-dionitrile, 1,4-bis(cyanoethoxy) butane, diethylene glycol di(2-cyanoethyl) ether, triethylene glycol di(2-cyanoethyl) ether, tetraethylene glycol di(2-cyanoethyl) ether, 1,3-di(2-cyanoethoxy) propane, 1,4-di(2-cyanoethoxy) butane, 1,5-di(2-cyanoethoxy) pentane, ethylene glycol di(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentamethylenetricarbonitrile, 1,2,3-propanetricarbonitrile, 1,3,6-hexanetricarbonitrile, 1,2,6-hexanetricarbonitrile, 1,2,3-tris(2-cyanoethoxy) propane, 1,2,4-tris(2-cyanoethoxy) butane, 1,1,1-tris(cyanoethoxymethylene) ethane, 1,1,1-tris(cyanoethoxymethylene) propane, 3-methyl-1,3,5-tris(cyanoethoxy) pentane, 1,2,7-tris (cyanoethoxy) heptane, 1,2,6-tris(cyanoethoxy) hexane, or 1,2,5-tris(cyanoethoxy) pentane.

9. The electrochemical apparatus according to claim 1, wherein the compound having the cyano group comprises an ether bond-free dinitrile compound and an ether bond-containing dinitrile compound, and a content percentage of the ether bond-free dinitrile compound is greater than a content percentage of the ether bond-containing dinitrile compound.

10. The electrochemical apparatus according to claim 1, wherein the compound having the cyano group comprises a dinitrile compound and a trinitrile compound, and a content percentage of the dinitrile compound is greater than a content percentage of the trinitrile compound.

11. The electrochemical apparatus according to claim 1, wherein the compound having the cyano group comprises a dinitrile compound and an ether bond-containing trinitrile compound, and a content percentage of the dinitrile compound is greater than a content percentage of the ether bond-containing trinitrile compound.

12. The electrochemical apparatus according to claim 1, wherein the electrolyte further comprises at least one of the following compounds:

a) fluoroethylene carbonate;
b) sulfur-oxygen double bond-containing compound;
c) lithium difluorophosphate; or
d) compound of Formula 1:

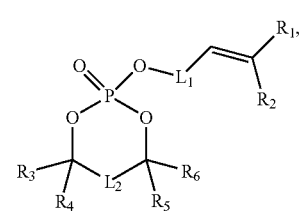

Formula 1 wherein:
$R_1$, $R_2$, $R_3$, $R_4$, $R_5$, and $R_6$ each are independently hydrogen or $C_1$-$C_{10}$ alkyl;
$L_1$ and $L_2$ each are independently $-(CR^7R^8)_n-$;
$R^7$ and $R^8$ each are independently hydrogen or $C_1$-$C_{10}$ alkyl; and
N is 1, 2, or 3.

13. The electrochemical apparatus according to claim 12, wherein the compound of Formula 1 comprises at least one of the following compounds:

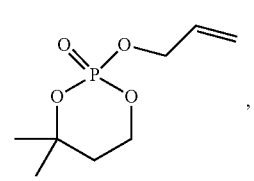

Formula 1-1

,

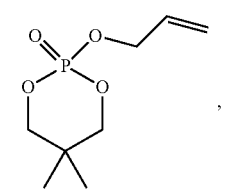

Formula 1-2

,

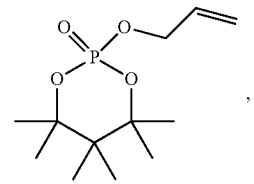

Formula 1-3

,

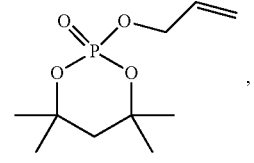

Formula 1-4

,

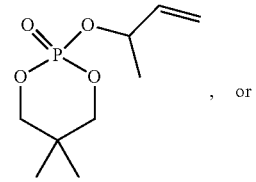

Formula 1-5

, or

Formula 1-6

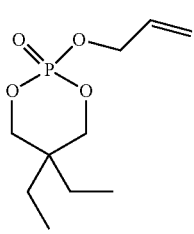

14. The electrochemical apparatus according to claim 12, wherein based on a weight of the electrolyte, a content percentage of the compound of Formula 1 is within a range of 0.01% to 5%.

15. The electrochemical apparatus according to claim 12, wherein based on a weight of the electrolyte, a content percentage of the fluoroethylene carbonate is b %, and b is within a range of 0.1 to 10.

16. The electrochemical apparatus according to claim 15, wherein 4≤Y×b≤200.

17. An electronic apparatus, comprising an electrochemical apparatus,
wherein, the electrochemical apparatus comprises a positive electrode, a negative electrode, and an electrolyte;
the negative electrode comprises a negative electrode current collector and a negative electrode mixture layer formed on the negative electrode current collector, and the negative electrode mixture layer comprises a negative electrode active substance;
wherein, an elongation at a yield point of the negative electrode mixture layer is X %, and a median particle size of the negative electrode active substance is Y um, and 0.1≤X/Y≤30; and
the electrolyte comprises a compound having a cyano group; and
wherein the negative electrode active substance comprises a metal, the metal comprises at least one of molybdenum, iron, or copper, and based on a weight of the negative electrode mixture layer, a content percentage of the metal is greater than 0 and less than 0.05%.

18. The electronic apparatus according to claim 17, wherein X is within a range of 10 to 30 and Y is within a range of 1 to 50.

19. The electronic apparatus according to claim 17, wherein the negative electrode mixture layer comprises rubber, and the rubber comprises at least one of styrene-butadiene rubber, isoprene rubber, butadiene rubber, fluorine rubber, acrylonitrile-butadiene rubber or styrene-propylene rubber.

20. The electronic apparatus according to claim 17, wherein the compound having the cyano group comprises at least one of succinonitrile, glutaronitrile, adiponitrile, 1,5-dicyanopentane, 1,6-dicyanohexane, tetramethylsuccinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile) ether, 3,5-dioxa-heptanedionitrile, 1,4-bis(cyanoethoxy) butane, diethylene glycol di(2-cyanoethyl) ether, triethylene glycol di(2-cyanoethyl) ether, tetraethylene glycol di(2-cyanoethyl) ether, 1,3-di(2-cyanoethoxy) propane, 1,4-di(2-cyanoethoxy) butane, 1,5-di(2-cyanoethoxy) pentane, ethylene glycol di(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentamethylenetricarbonitrile, 1,2,3-propanetricarbonitrile, 1,3,6-hexanetricarbonitrile, 1,2,6-hexanetricarbonitrile, 1,2,3-tris(2-cyanoethoxy) propane, 1,2,4-tris(2-cyanoethoxy) butane, 1,1,1-tris(cyanoethoxymethylene) ethane, 1,1,1-tris(cyanoethoxymethylene) propane, 3-methyl-1,3,5-tris(cyanoethoxy) pentane, 1,2,7-tris (cyanoethoxy) heptane, 1,2,6-tris(cyanoethoxy) hexane, or 1,2,5-tris(cyanoethoxy) pentane.

21. The electrochemical apparatus according to claim 1, wherein the negative electrode active substance has a specific surface area of less than 3 $m^2/g$.

22. The electronic apparatus according to claim 17, wherein the negative electrode active substance has a specific surface area of less than 3 $m^2/g$.

* * * * *